US011921249B2

(12) United States Patent
Hori et al.

(10) Patent No.: US 11,921,249 B2
(45) Date of Patent: Mar. 5, 2024

(54) ULTRASONIC ACOUSTIC SENSORS FOR MEASURING FORMATION VELOCITIES

(71) Applicant: Schlumberger Technology Corporation, Sugar Land, TX (US)

(72) Inventors: Hiroshi Hori, Clamart (FR); Evgeniya Deger, Sugar Land, TX (US); Tatsuaki Kamoi, Kanagawa-ken (JP); Hiroshi Nakajima, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 689 days.

(21) Appl. No.: 16/967,149

(22) PCT Filed: Feb. 8, 2019

(86) PCT No.: PCT/US2019/017145
§ 371 (c)(1),
(2) Date: Aug. 4, 2020

(87) PCT Pub. No.: WO2019/157242
PCT Pub. Date: Aug. 15, 2019

(65) Prior Publication Data
US 2021/0055444 A1    Feb. 25, 2021

Related U.S. Application Data

(60) Provisional application No. 62/627,869, filed on Feb. 8, 2018.

(51) Int. Cl.
G01V 1/50     (2006.01)
E21B 49/00   (2006.01)
G01V 1/46     (2006.01)

(52) U.S. Cl.
CPC ............... *G01V 1/50* (2013.01); *E21B 49/00* (2013.01); *G01V 1/46* (2013.01);
(Continued)

(58) Field of Classification Search
CPC .... G01V 1/50; G01V 1/46; G01V 2210/1299; G01V 2210/1429; G01V 2210/6222; E21B 49/00
See application file for complete search history.

(56) References Cited

U.S. PATENT DOCUMENTS 2,769,867 A    11/1956   Crownover
3,437,834 A     4/1969   Schwartz
(Continued)

FOREIGN PATENT DOCUMENTS

CA    2581535 A1    4/2006
CN   101349152 A    1/2009
(Continued)

OTHER PUBLICATIONS

Notice of Allowance issued in U.S. Appl. No. 16/412,140 dated Feb. 15, 2022, 14 pages.
(Continued)

Primary Examiner — Krystine E Breier

(57) ABSTRACT

Example ultrasonic acoustic sensors for measuring formation velocities are disclosed herein. An example sensor includes a housing, a first transmitter carried by the housing, a second transmitter carried by the housing, and a receiver array carried by the housing and disposed between the first transmitter and the second transmitter. The first transmitter is disposed at a first angle relative to a surface the housing and the second transmitter is disposed at second angle relative to the surface the housing.

13 Claims, 13 Drawing Sheets

(52) U.S. Cl.
CPC ............... *G01V 2210/1299* (2013.01); *G01V 2210/1429* (2013.01); *G01V 2210/6222* (2013.01)

(56) References Cited

U.S. PATENT DOCUMENTS

| | | | |
|---|---|---|---|
| 3,502,169 | A | 3/1970 | Chapman |
| 3,524,162 | A * | 8/1970 | Zill ........................... G06J 1/00 |
| | | | 324/132 |
| 4,255,798 | A | 3/1981 | Havira |
| 4,594,691 | A | 6/1986 | Kimball et al. |
| 4,594,692 | A | 6/1986 | Read et al. |
| 4,757,479 | A * | 7/1988 | Masson ................... G01V 1/44 |
| | | | 181/105 |
| 5,299,578 | A | 4/1994 | Rotteveel et al. |
| 5,354,956 | A | 10/1994 | Orban et al. |
| 5,398,215 | A | 3/1995 | Sinha et al. |
| 5,511,037 | A | 4/1996 | Randall et al. |
| 5,581,024 | A | 12/1996 | Meyer, Jr. et al. |
| 5,747,672 | A | 5/1998 | Parent et al. |
| 5,753,812 | A | 5/1998 | Aron et al. |
| 6,205,087 | B1 | 3/2001 | Fukuhara et al. |
| 6,466,513 | B1 | 10/2002 | Pabon et al. |
| 6,483,225 | B1 | 11/2002 | Spigelmyer |
| 6,510,389 | B1 | 1/2003 | Winkler et al. |
| 6,643,221 | B1 | 11/2003 | Hsu et al. |
| 6,678,616 | B1 | 1/2004 | Winkler et al. |
| 7,399,284 | B2 | 7/2008 | Miwa et al. |
| 7,460,435 | B2 | 12/2008 | Garcia-Osuna et al. |
| 7,675,813 | B2 | 3/2010 | Valero et al. |
| 7,694,570 | B1 | 4/2010 | Dam et al. |
| 7,913,806 | B2 | 3/2011 | Pabon et al. |
| 9,027,670 | B2 | 5/2015 | Sugiura |
| 9,625,599 | B2 | 4/2017 | Prioul et al. |
| 10,012,763 | B2 | 7/2018 | Perkins et al. |
| 10,605,944 | B2 * | 3/2020 | Han ........................ G01V 1/50 |
| 2003/0067249 | A1 | 4/2003 | Lockwood et al. |
| 2003/0073906 | A1 | 4/2003 | Flesch et al. |
| 2003/0130657 | A1 | 7/2003 | Tom et al. |
| 2003/0144989 | A1 | 7/2003 | Schoemann |
| 2004/0048470 | A1 | 3/2004 | Dinet et al. |
| 2005/0000279 | A1 | 1/2005 | Yogeswaren |
| 2005/0152219 | A1 | 7/2005 | Garcia-Osuna et al. |
| 2006/0133205 | A1 | 6/2006 | Van Kuijk et al. |
| 2006/0233048 | A1 * | 10/2006 | Froelich ................ E21B 47/005 |
| | | | 367/35 |
| 2006/0254767 | A1 | 11/2006 | Pabon et al. |
| 2007/0124000 | A1 | 5/2007 | Moughler et al. |
| 2008/0037808 | A1 | 2/2008 | Sawada et al. |
| 2008/0186805 | A1 | 8/2008 | Han |
| 2008/0228231 | A1 | 9/2008 | Raphael et al. |
| 2009/0183941 | A1 | 7/2009 | Pabon et al. |
| 2012/0029393 | A1 | 2/2012 | Lee |
| 2012/0182831 | A1 * | 7/2012 | Cooper ................. E21B 47/107 |
| | | | 367/25 |
| 2013/0060140 | A1 | 3/2013 | Sinelnikov |
| 2013/0286778 | A1 * | 10/2013 | Kisner ..................... G01S 15/89 |
| | | | 367/87 |
| 2013/0341091 | A1 | 12/2013 | Sugiura |
| 2014/0013850 | A1 | 1/2014 | Kim et al. |
| 2014/0031164 | A1 | 1/2014 | Fukuoka et al. |
| 2014/0177388 | A1 | 6/2014 | D'Angelo et al. |
| 2015/0211352 | A1 | 7/2015 | Sugiura |
| 2017/0167253 | A1 | 6/2017 | Lemarenko et al. |
| 2017/0199295 | A1 | 7/2017 | Mandal |
| 2017/0293044 | A1 | 10/2017 | Gilstrap et al. |
| 2017/0314385 | A1 | 11/2017 | Hori et al. |
| 2018/0017701 | A1 | 1/2018 | San Martin et al. |
| 2019/0310173 | A1 | 10/2019 | Mayes |
| 2019/0345816 | A1 | 11/2019 | Auchere et al. |
| 2020/0363550 | A1 * | 11/2020 | Nakajima ................ G01V 1/52 |

FOREIGN PATENT DOCUMENTS

| | | |
|---|---|---|
| CN | 102818841 A | 12/2012 |
| CN | 202788824 | 3/2013 |
| CN | 104254667 A | 12/2014 |
| CN | 104520734 A | 4/2015 |
| CN | 104594878 A | 5/2015 |
| CN | 106481336 A | 3/2017 |
| CN | 106930758 A | 7/2017 |
| CN | 107530735 A | 1/2018 |
| EP | 1806473 A1 | 7/2007 |
| EP | 2685255 | 1/2014 |
| GB | 2254921 A | 10/1992 |
| JP | 3372572 B2 | 2/2003 |
| KR | 200442120 Y1 | 10/2008 |
| KR | 101547508 B1 | 8/2015 |
| WO | 2009061561 A1 | 5/2009 |
| WO | 2012027630 A2 | 3/2012 |
| WO | WO-2013081608 A1 * | 6/2013 ........... E21B 47/101 |

OTHER PUBLICATIONS

B. Mandal and A. Quintero, "A new monocable circumferential acoustic scanner tool (Cast-M) for cased-hole and openhole applications", SPWLA 51st Annual Logging Symposium held in Perth, Western Australia, Jun. 19-23, 2010, 14 pages.

Office Action issued in U.S. Appl. No. 16/967,147 dated Dec. 24, 2021, 24 pages.

Zhang, X. et al., "Application of Modern Acoustic Logging Technology", Petroleum (Logging) Instruments, 2014, 28 (1), pp. 1-6.

First Office Action issued in China Patent Application No. 2019800143364 dated Feb. 21, 2023, 28 pages with English translation.

First Office Action issued in China Patent Application No. 201980013713.2 dated Feb. 21, 2023, 39 pages with English translation.

Office Action issued in U.S. Appl. No. 16/412,140 dated Sep. 24, 2021, 18 pages.

Kimball, C. V. et al., Semblance Processing of Borehole Acoustic Array Data, Geophysics, 1984, 49(3), pp. 274-281.

International Search Report and Written Opinion issued in International Patent application PCT/US2019/017146 dated May 7, 2019, 13 pages.

International Search Report and Written Opinion issued in International Patent application PCT/US2019/017145 dated May 21, 2019, 11 pages.

Dashevskiy, D. et al., "Dynamic Depth Correction to Reduce Depth Uncertainty and Improve MWD/LWD Log Quality", Mar. 2008 SPE Drilling & Completion, pp. 13-22.

Office Action issued in U.S. Appl. No. 16/412,140 dated Apr. 28, 2021, 25 pages.

2nd Office Action issued in Chinese Patent Application No. 201980013713.2 dated Aug. 31, 2023, 15 pages with English translation.

2nd Office Action issued in Chinese Patent Application No. 2019800143364 dated Aug. 17, 2023, 24 pages with English translation.

Office Action issued in U.S. Appl. No. 17/660,845 dated Jul. 13, 2023, 19 pages.

* cited by examiner

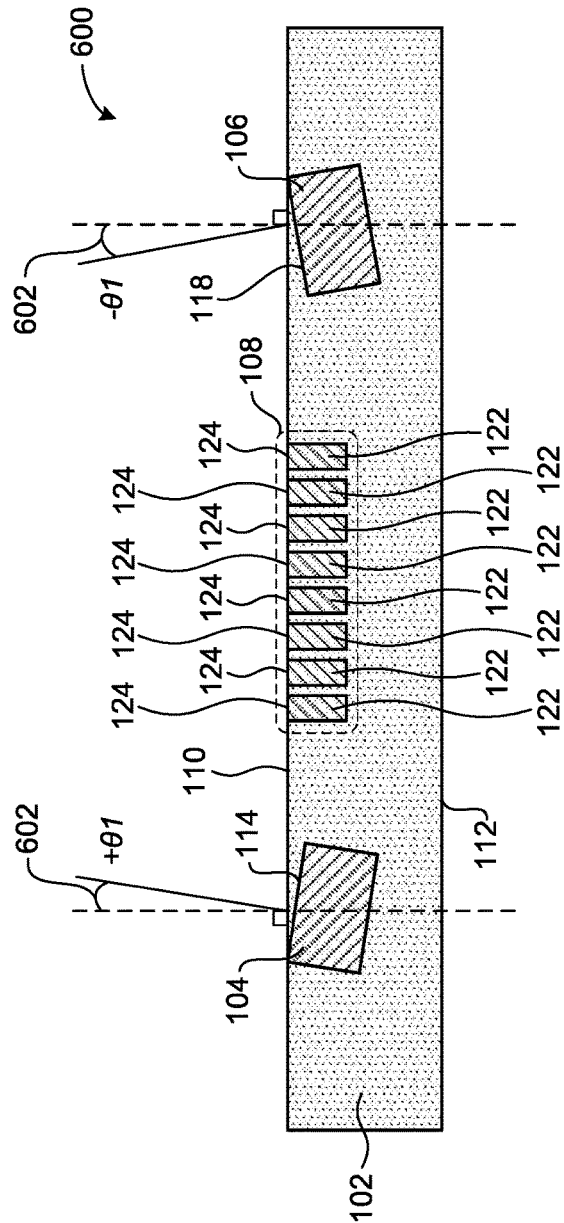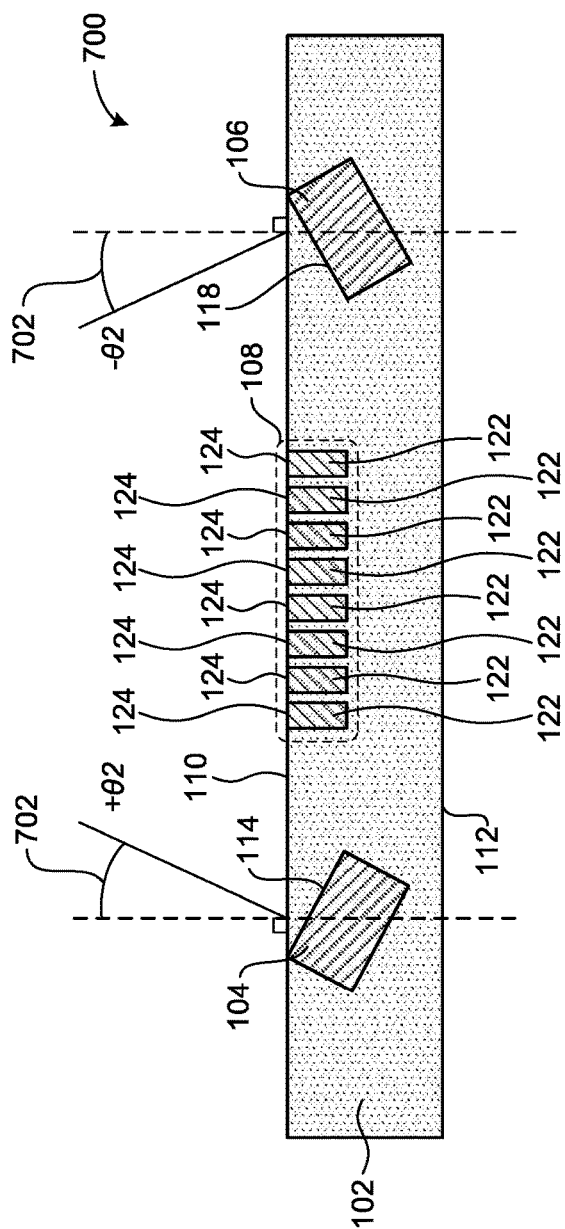

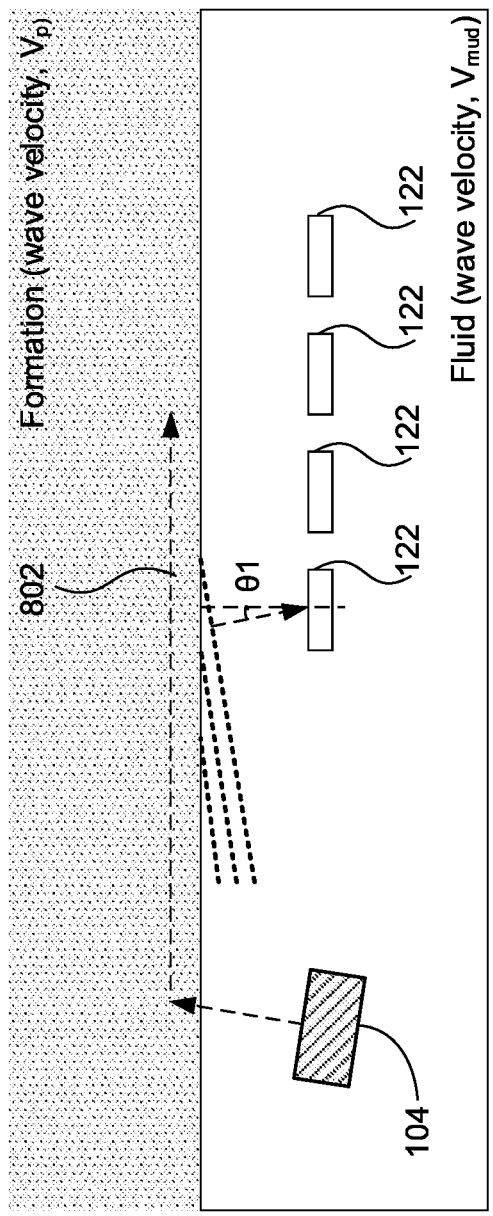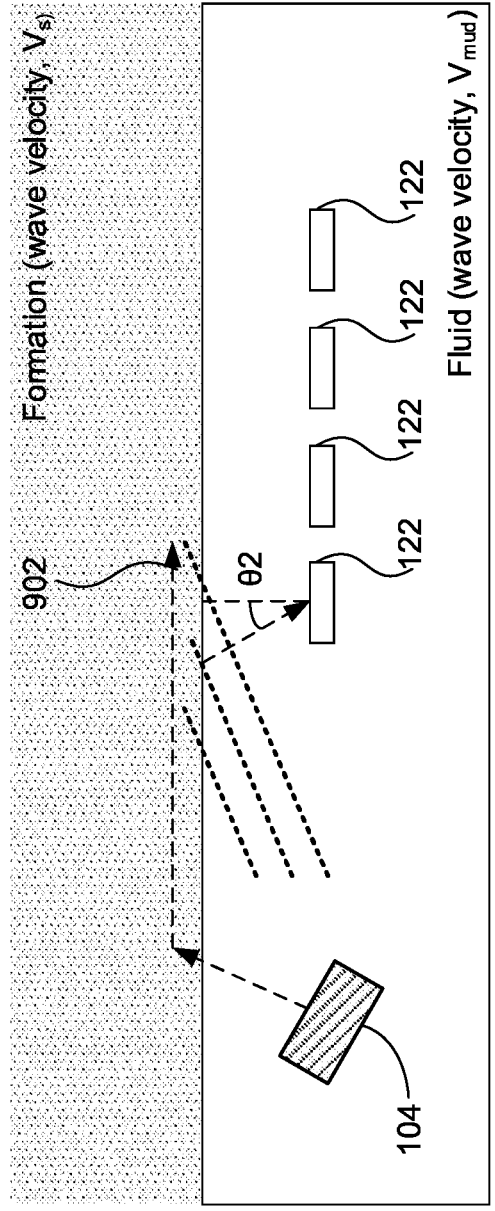

ULTRASONIC ACOUSTIC SENSORS FOR MEASURING FORMATION VELOCITIES

RELATED APPLICATION

This patent claims the benefit of U.S. Provisional Patent Application Ser. No. 62/627,869, which was filed on Feb. 8, 2018. U.S. Provisional Patent Application Ser. No. 62/627,869 is hereby incorporated herein by reference in its entirety. Priority to U.S. Provisional Patent Application Ser. No. 62/627,869 is hereby claimed.

BACKGROUND

This disclosure relates generally to acoustic sensors and, more specifically, to ultrasonic acoustic sensors for measuring formation velocities.

DESCRIPTION OF THE RELATED ART

The generation and recording of borehole acoustic waves is an important measurement employed in oilfield borehole logging. Many borehole tools and methods are currently available for taking acoustic measurements. Some tools include a single source of sonic waves and two or more receivers. Other tools include two or more acoustic sources and multiple receivers arranged in an array. Currently available acoustic tools are useful in providing a large range of information regarding the surrounding formation and the borehole parameters.

U.S. Pat. No. 6,678,616 describes methods and tools for producing formation velocity image data sets. U.S. Pat. No. 6,510,389 describes methods for acoustic detection of stress-induced mechanical damage in borehole walls. U.S. Pat. No. 7,913,806 describes enclosures for containing acoustic transducers and electronics on downhole tools. U.S. Pat. No. 9,625,599 describes a downhole acoustic logging tool for making circumferential velocity measurements, the logging tool including at least one acoustic transmitter and first and second arrays of acoustic receivers deployed on a tool body. U.S. Patent Publication No. 2017/0314385 describes systems and methods for acoustic measurement driven geo-steering.

U.S. Pat. No. 3,524,162 describes systems including multiple acoustic receivers and transmitters for measuring sonic attenuation ratios in earth formations. U.S. Pat. No. 3,437,834 describes methods and apparatus for detecting the time of occurrence of a selected signal. U.S. Pat. No. 6,205,087 describes sonic data logging methods and systems for determining characteristics of the formations through which a borehole passes. U.S. Pat. No. 7,675,813 describes methods and apparatus for detecting first arrival data for component signals of interest, which may be used to estimate formation slowness. U.S. Pat. No. 4,594,691 describes sonic well logging methods and systems for determining slowness-time coherence. U.S. Pat. No. 5,398,215 describes methods and apparatus for measuring stress induced azimuthal anisotropy in earth formations. An article titled "Semblance Processing of Borehole Acoustic Array Data," authored by Christopher V. Kimball and Thomas L. Marzetta, published in GEOPHYSICS, 49(3), 1984, pp. 274-281, describes semblance processing of borehole acoustic array data.

BRIEF DESCRIPTION OF THE DRAWINGS

FIG. 6 is a cross-sectional view of an example first ultrasonic acoustic sensor implemented according to an example first preferred and/or critical angle.

FIG. 7 is a cross-sectional view of an example second ultrasonic acoustic sensor implemented according to an example second preferred and/or critical angle.

FIG. 8 is a schematic of the example first transmitter of the example first ultrasonic acoustic sensor of FIG. 6 exciting an example fast formation wave.

FIG. 9 is a schematic of the example first transmitter of the example second ultrasonic acoustic sensor of FIG. 7 exciting an example slow formation wave.

Figure 1:
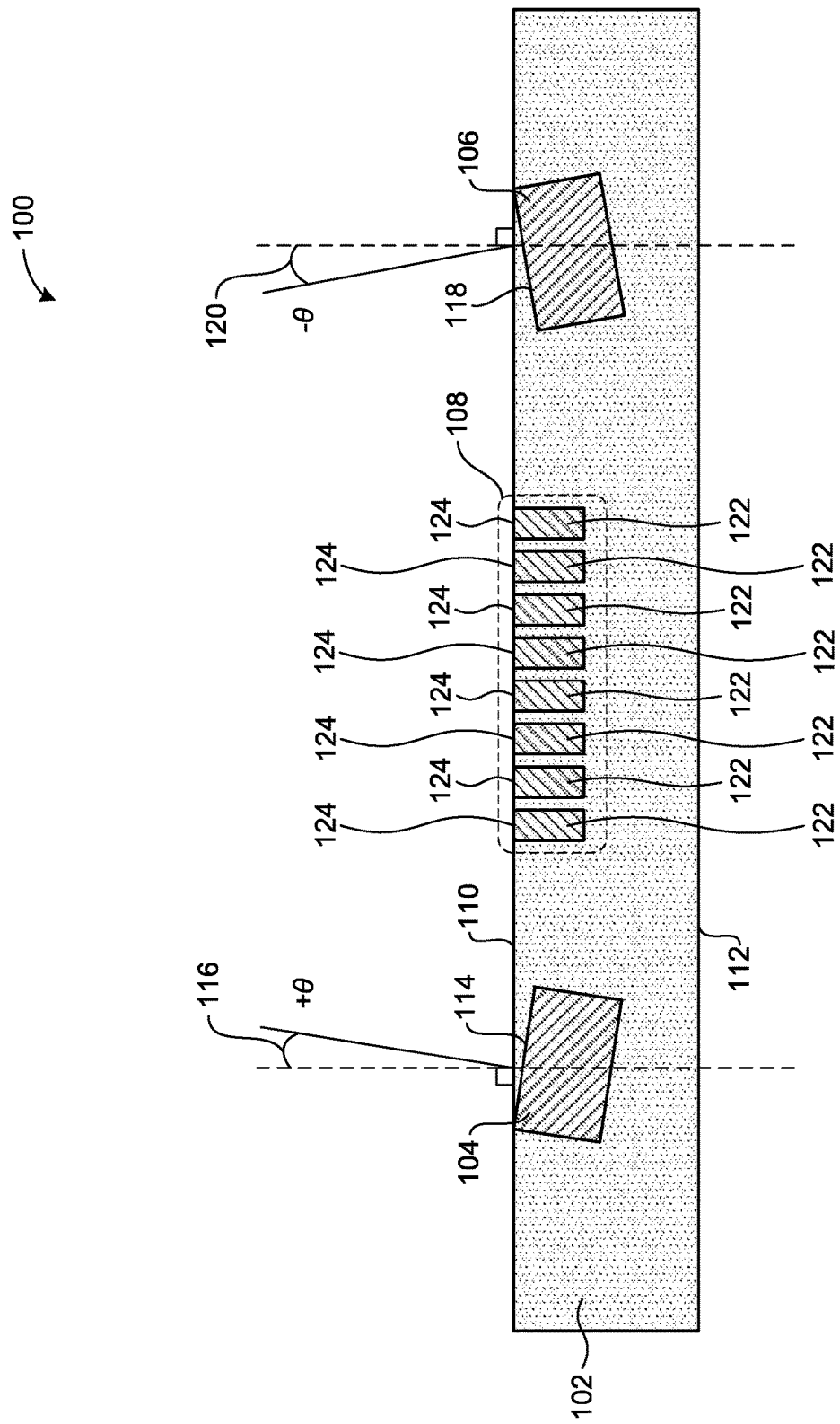
FIG. 1 is a cross-sectional view of an example ultrasonic acoustic sensor that may be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Conventional acoustic sensors for measuring formation velocities do not provide for velocity error compensation when the borehole wall of the target formation is not perfectly parallel to an array line and/or planar orientation of the receiver array of the acoustic sensor. Unlike such conventional acoustic sensors, the ultrasonic acoustic sensors disclosed herein provide velocity error compensation when measuring formation velocities, even when the borehole wall of the target formation is at an angle relative to the array line of the receiver array of the ultrasonic acoustic sensor. The disclosed ultrasonic acoustic sensors enable reliable and robust acoustic wave propagation velocity measurements in target formations at ultrasonic frequencies. The disclosed ultrasonic acoustic sensors are preferably applied in oil well logging environments to measure fast waves (e.g., P-waves) and slow waves (e.g., S-waves) that propagate near the wellbore surface (e.g., for hydrocarbon exploration and production purposes).

In some examples, the disclosed ultrasonic acoustic sensors include at least two transmitters and at least one receiver array positioned and/or located between the at least two transmitters. The transmitters and receiver array(s) of the disclosed ultrasonic acoustic sensors are arranged and/or configured to enable borehole and/or velocity error compensation in connection with formation velocity measurements made via the ultrasonic acoustic sensors. In some examples, the transmitters are mounted on and/or within the ultrasonic acoustic sensor at an angle that is respectively tilted (e.g., to ±θ) to excite or effectively excite formation waves toward the receiver array of the ultrasonic acoustic sensor. In some examples, multiple (e.g., two) ultrasonic acoustic sensors are mounted on and/or coupled to a downhole tool. In some such examples, the transmitters of a first one of the ultrasonic acoustic sensors may be mounted on and/or within the first one of the ultrasonic acoustic sensors at a first angle that is respectively tilted (e.g., to ±θ1) to excite fast formation waves (e.g., P-waves) toward the receiver array of the first ultrasonic acoustic sensor, and the transmitters of a second one of the ultrasonic acoustic sensors may be mounted on and/or within the second one of the ultrasonic acoustic sensors at a second angle that is respectively tilted (e.g., to ±θ2) to excite slow formation waves (e.g., S-waves) toward the receiver array of the second ultrasonic acoustic sensor.

FIG. 1 is a cross-sectional view of an example ultrasonic acoustic sensor 100 that may be implemented in accordance with the teachings of this disclosure. The ultrasonic acoustic sensor 100 of FIG. 1 includes an example housing 102, an example first transmitter 104, an example second transmitter 106, and an example receiver array 108 positioned and/or located between the first transmitter 104 and the second transmitter 106. In other examples, the ultrasonic acoustic sensor 100 may include other transmitters in addition to the first transmitter 104 and the second transmitter 106 shown in FIG. 1. For example, the ultrasonic acoustic sensor 100 may include a total of three, four, eight, or any other plural number of transmitters arranged around the receiver array 108.

The example housing 102 of FIG. 1 has an example first surface 110 and an example second surface 112 located opposite the first surface 110. In some examples, the first surface 110 of the housing 102 is to face and/or be positioned toward a geological formation to facilitate measurement of a velocity of the geological formation by the ultrasonic acoustic sensor 100 of FIG. 1. In the illustrated example of FIG. 1, the housing 102 has a generally rectangular cross-sectional shape. In other examples, the housing 102 may have other cross-sectional shapes, including regular (e.g., triangular, trapezoidal, circular, elliptical, etc.) and irregular geometric shapes.

The example first transmitter 104 of FIG. 1 is mounted on, embedded in, and/or carried by the housing 102 such that the position and/or location of the first transmitter 104 is fixed relative to the position and/or location of the housing 102. The first transmitter 104 includes an example transmission surface 114 from which the first transmitter 104 emits acoustic signals having one or more ultrasonic frequencies (e.g., first ultrasonic acoustic signal(s)). In the illustrated example of FIG. 1, the transmission surface 114 of the first transmitter 104 is positioned at a first angle (+θ) 116 relative to the first surface 110 of the housing 102, such that the transmission surface 114 of the first transmitter 104 is tilted toward the receiver array 108.

The example second transmitter 106 of FIG. 1 is mounted on, embedded in, and/or carried by the housing 102 such that the position and/or location of the second transmitter 106 is fixed relative to the position and/or location of the housing 102. The second transmitter 106 includes an example transmission surface 118 from which the second transmitter 106 emits acoustic signals having one or more ultrasonic frequencies (e.g., second ultrasonic acoustic signal(s)). In the illustrated example of FIG. 1, the transmission surface 118 of the second transmitter 106 is positioned at a second angle (−θ) 120 relative to the first surface 110 of the housing 102, such that the transmission surface 118 of the second transmitter 106 is tilted toward the receiver array 108.

The second angle (−θ) 120 is equal in magnitude to the first angle (+θ) 116, but opposite in terms of the direction of orientation and/or rotation. For example, as shown in FIG. 1, the transmission surface 114 of the first transmitter 104 is positively tilted (e.g., in a clockwise direction) toward the receiver array 108 at a first angular magnitude (e.g., θ), and the transmission surface 118 of the second transmitter 106 is negatively tilted (e.g., in a counter-clockwise direction) toward the receiver array 108 at a second angular magnitude (e.g., θ) equal to the first angular magnitude. In some examples, the preferred and/or critical angle (θ) at which the transmission surface 114 of the first transmitter 104 and the transmission surface 118 of the second transmitter 106 are respectively tilted relative to the first surface 110 of the housing 102 may be expressed and/or defined as follows:

$$\theta = \sin^{-1}\left(\frac{V_{mud}}{V}\right) \qquad \text{Equation 1}$$

In Equation 1, V is the expected wave propagation velocity of a formation, $V_{mud}$ is the expected wave propagation velocity of a well fluid, and θ is the preferred and/or critical angle.

The example receiver array 108 of FIG. 1 includes example receivers 122 that are spaced apart from one another within the receiver array 108. In some examples, the receivers 122 of the receiver array 108 may be equally spaced apart from one another. The receivers 122 of the receiver array 108 are mounted on, embedded in, and/or carried by the housing 102 such that the position and/or location of the receivers 122 and/or the receiver array 108 is fixed relative to the position and/or location of the housing 102. In the illustrated example of FIG. 1, respective ones of the receivers 122 of the receiver array 108 are positioned and/or located such that an example reception surface 124 of each receiver 122 is adjacent and/or aligned with (e.g., flush with) the first surface 110 of the housing 102. In other examples, one or more of the receivers 122 may be positioned and/or located differently (e.g., adjacent the second surface 112 of the housing 102) relative to the respective locations and/or positions of the receivers 122 shown in FIG. 1. In the illustrated example of FIG. 1, the receiver array 108 includes a total of eight receivers 122 equally spaced apart from one another within the receiver array 108. In other examples, the receiver array 108 may include a different number of receivers 122 (e.g., two, four, sixteen, etc.).

Respective ones of the receivers 122 of FIG. 1 are structured and/or configured to receive ultrasonic acoustic waves and/or signals propagated through a formation in response to the ultrasonic acoustic signals transmitted by the first transmitter 104 and the second transmitter 106 of the ultrasonic acoustic sensor 100 of FIG. 1, and to convert the received ultrasonic acoustic waves and/or signals into corresponding electrical signals. For example, respective ones of the receivers 122 may receive one or more ultrasonic acoustic wave(s) propagated through a geological formation in response to an ultrasonic acoustic signal transmitted by the first transmitter 104, and subsequently refracted from the geological formation toward the receivers 122. As another example, respective ones of the receivers 122 may additionally receive one or more ultrasonic acoustic wave(s) propagated through the geological formation in response to an ultrasonic acoustic signal transmitted by the second transmitter 106, and subsequently refracted from the geological formation toward the receivers 122. In such examples, the receivers 122 may convert the received ultrasonic acoustic waves into corresponding electrical signals. The corresponding electrical signals may be forwarded to a controller. The controller may implement one or more waveform processing algorithms or techniques to calculate and/or determine a formation velocity (e.g., a wave propagation velocity for the formation) based on the corresponding electrical signals measured by the receivers 122.

Figure 2:
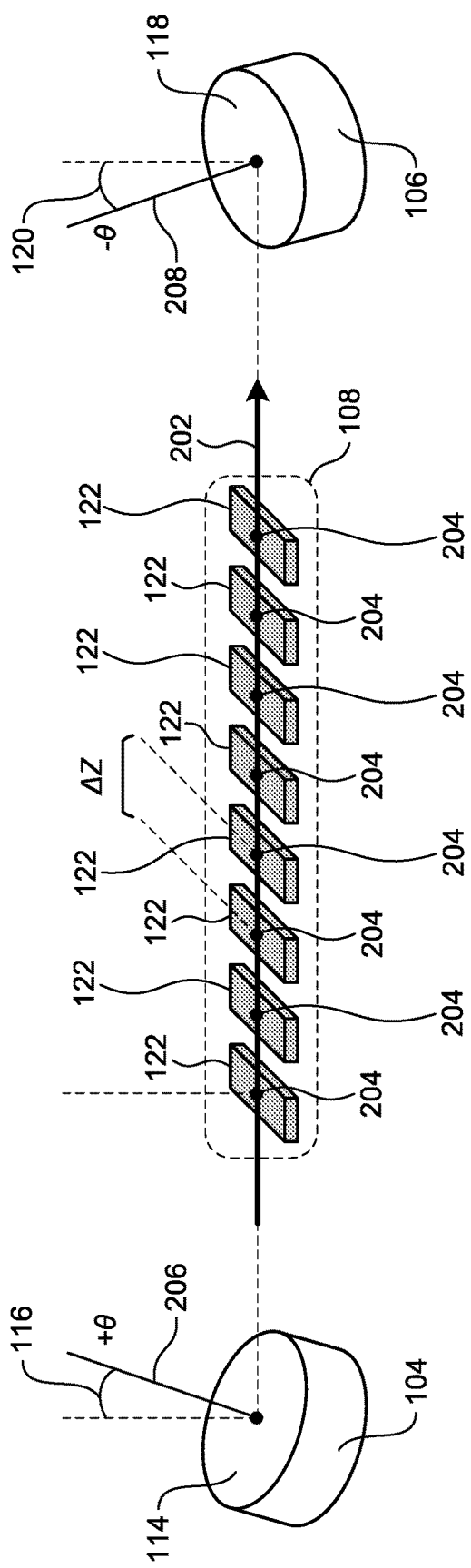
FIG. 2 is a perspective view of the example first transmitter, the example second transmitter, and the example receiver array of FIG. 1 showing respective ones of the example receivers of the receiver array spaced apart from one another along an example array line.

FIG. 2 is a perspective view of the example first transmitter 104, the example second transmitter 106, and the example receiver array 108 of FIG. 1 showing respective ones of the example receivers 122 of the receiver array 108 spaced apart from one another along an example array line 202. In some examples, the receiver array 108 may have a length extending along the array line 202 of FIG. 2. In some such examples, the length of the receiver array 108 may be between approximately 0.02 meters (0.02 m) and 0.30 meters (0.30 m). In some examples, the first transmitter 104 and/or the second transmitter 106 emit(s) ultrasonic acoustic signals having one or more ultrasonic frequencies. In some such examples, the ultrasonic frequencies of the ultrasonic acoustic signals may be between approximately fifty kilohertz (50 kHz) and five hundred kilohertz (500 kHz).

In the illustrated example of FIG. 2, the receivers 122 of the receiver array 108 are equally spaced apart from one another. In other examples, the receivers 122 of the receiver array 108 may be spaced apart from one another at different (e.g., non-equal) intervals. In the illustrated example of FIG. 2, the first transmitter 104 and the second transmitter 106 have respective cylindrical shapes. In other examples, the first transmitter 104 and/or the second transmitter 106 may have other shapes, including regular (e.g., cubic, prismatic, conical, spherical, pyramidal, etc.) and irregular geometric shapes. In the illustrated example of FIG. 2, the receivers 122 have respective rectangular prismatic shapes. In other examples, one or more of the receivers 122 may have other shapes, including regular (e.g., cubic, prismatic, cylindrical, conical, spherical, pyramidal, etc.) and irregular geometric shapes.

As shown in FIG. 2, each receiver 122 of the receiver array 108 includes an example reference point 204 that is defined as the sensitivity center of the receiver 122. In some examples, the reference point 204 of a corresponding one of the receivers 122 may be located at the geometrical center of the reception surface 124 of the corresponding one of the receivers 122, or at the geometrical center of a positive or a negative electrode of the corresponding one of the receivers 122. In some examples, a spacing and/or distance between two adjacent and/or neighboring ones of the receivers 122 may be calculated and/or determined based on a spatial difference between the respective reference points 204 of the two adjacent and/or neighboring ones of the receivers 122 (e.g., shown in FIG. 2 as ΔZ). In some examples, the one or more of the receivers 122 are oriented such that the sensitivity center 204 of the respective receivers 122 has substantially similar sensitivity to signals associated with the first transmitter 104 and signals associated with the second transmitter 106. For example, the receiver(s) 122 can be oriented relative to the first surface 110 of the housing 102 such that the reception surface 124 is substantially parallel to the first surface 110 of the housing 102 (i.e., the receiver(s) 122 are not tilted relative to the first surface 110 of the housing 102).

The array line 202 of FIG. 2 is a vector that defines the orientation of the receiver array 108. In the illustrated example of FIG. 2, the array line 202 connects and/or passes through respective ones of the reference points 204 of the receivers 122. In some such examples, each of the reference points 204 of the receivers 122 may be exactly aligned with the array line 202. In other examples, one or more of the reference points 204 of the receivers 122 may be substantially aligned with the array line 202 such that the maximum distance between any one of the reference points 204 and the array line 202 does not exceed a tolerance and/or threshold (e.g., less than ten percent of the spacing and/or distance between adjacent and/or neighboring ones of the receivers 122).

Wave propagation velocities associated with a formation can be calculated and/or determined with a high degree of accuracy when the array line 202 of FIG. 2 is parallel to a borehole surface of the formation from which the ultrasonic acoustic waves propagating through the formation are refracted. In some examples, the array line 202, an example central axis 206 of the first transmitter 104, and an example central axis 208 of the second transmitter 106 are substantially coplanar. In some such examples, the substantially coplanar arrangement facilitates an efficient excitation and detection of formation waves.

In some examples, the measured and/or calculated wave propagation velocity associated with a formation may be expressed and/or defined as follows:

$$V_{meas} = \frac{(Z \times |(N_{R1}\ N_{R2})|)}{|(T_{R1}\ T_{R2})|} \quad \text{Equation 2}$$

In Equation 2, $\Delta Z$ is the spacing and/or distance between adjacent and/or neighboring ones of the receivers 122 within the receiver array 108, $N_{R1}$ is a numerical identifier (e.g., N=1, 2, 3, 4, 5, 6, 7 or 8) assigned to a first one of the receivers 122 within the receiver array 108, $N_{R2}$ is a numerical identifier (e.g., N=1, 2, 3, 4, 5, 6, 7 or 8) assigned to a second one of the receivers 122 within the receiver array 108, $T_{R1}$ is the time at which a formation wave is received at the first one of the receivers 122, $T_{R2}$ is the time at which a formation wave is received at the second one of the receivers 122, and $V_{meas}$ is the measured and/or calculated wave propagation velocity for the formation.

Figure 3:
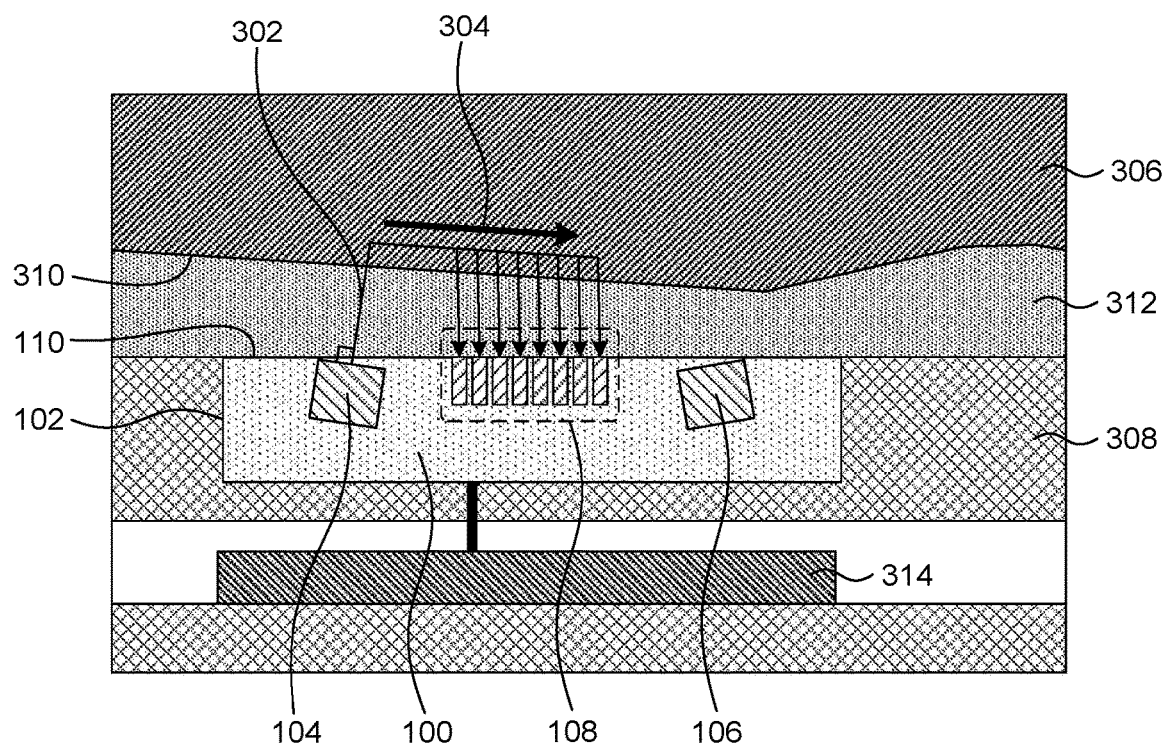
FIG. 3 illustrates the example first transmitter of the example ultrasonic acoustic sensor of FIGS. 1 and 2 emitting an example first ultrasonic acoustic signal toward an example formation to excite a formation wave in an example first direction within the formation.
Figure 4:
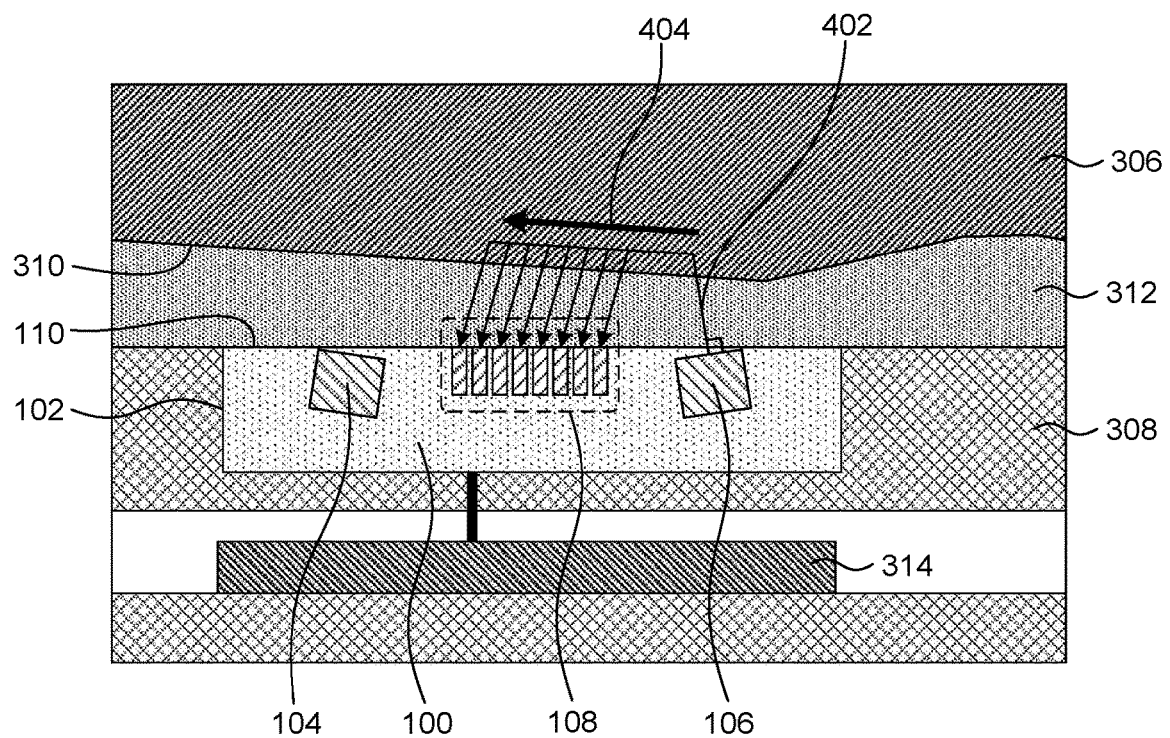
FIG. 4 illustrates the example second transmitter of the example ultrasonic acoustic sensor of FIGS. 1 and 2 emitting an example second ultrasonic acoustic signal toward the example formation of FIG. 3 to excite a formation wave in an example second direction within the formation.

FIG. 3 illustrates the example first transmitter 104 of the example ultrasonic acoustic sensor 100 of FIGS. 1 and 2 emitting an example first ultrasonic acoustic signal 302 toward an example formation 306 to excite a formation wave in an example first direction 304 within the formation 306. FIG. 4 illustrates the example second transmitter 106 of the example ultrasonic acoustic sensor 100 of FIGS. 1 and 2 emitting an example second ultrasonic acoustic signal 402 toward the example formation 306 of FIG. 3 to excite a formation wave in an example second direction 404 within the formation 306. In the illustrated examples of FIGS. 3 and 4, the ultrasonic acoustic sensor 100 is mounted on and/or coupled to an example downhole tool 308. In some examples, the ultrasonic acoustic sensor 100 and/or the downhole tool 308 of FIGS. 3 and 4 may be spaced apart from an example borehole wall 310 of the formation 306, as is generally shown in FIGS. 3 and 4. In some examples, a spacing and/or void between the downhole tool 308 and the borehole wall 310 of the formation 306 may be occupied (e.g., partially or substantially filled) by example well fluid 312 (e.g., drilling mud).

In the illustrated examples of FIGS. 3 and 4, the first transmitter 104, the second transmitter 106, the receiver array 108, and/or, more generally, the ultrasonic acoustic sensor 100 is/are operatively coupled to an example controller 314. In some examples, the controller 314 of FIGS. 3 and 4 transmits one or more control signal(s) to the first transmitter 104 and/or the second transmitter 106 instructing the first transmitter 104 and/or the second transmitter 106 to emit ultrasonic acoustic signals (e.g., the first ultrasonic acoustic signals 302 of FIG. 3 and/or the second ultrasonic acoustic signals 402 of FIG. 4). In some examples, the controller 314 may access, obtain, and/or receive one or more electrical signal(s) from one or more receiver(s) 122 of the receiver array 108 corresponding to formation waves received at and/or collected by the one or more receiver(s) 122 of the receiver array 108. In some examples, the controller 314 may implement one or more waveform processing algorithms or techniques to calculate and/or determine a formation velocity (e.g., a wave propagation velocity for the formation 306) based on the corresponding electrical signals measured by the receivers 122.

In the illustrated examples of FIGS. 3 and 4, the first surface 110 of the housing 102 is positioned at an angle relative to the borehole wall 310 of the formation 306 such that the first surface 110 is not parallel to the borehole wall 310. The borehole wall 310 is accordingly tilted relative to the orientation (e.g., as defined by the array line 202 of FIG. 2) of the receiver array 108. As explained above in connection with FIGS. 1 and 2, the first transmitter 104 and the second transmitter 106 of the ultrasonic acoustic sensor 100 are both tilted and/or angled toward the receiver array 108 at a preferred and/or critical angle ($\theta$). In the illustrated examples of FIGS. 3 and 4, the preferred and/or critical angle ($\theta$) defines a direction at which the first transmitter 104 emits the first ultrasonic acoustic signals 302 (e.g., from the first transmitter 104 toward the formation 306). The preferred and/or critical angle ($\theta$) also defines a direction at which the second transmitter 106 emits the second ultrasonic acoustic signals 402 (e.g., from the second transmitter 106 toward the formation 306). Emission of the first ultrasonic acoustic signals 302 by the first transmitter 104 excites formation waves in the first direction 304 within the formation 306. Emission of the second ultrasonic acoustic signals 402 by the second transmitter 106 excites formation waves in the second direction 404 within the formation 306.

When the receiver array 108 of the ultrasonic acoustic sensor 100 is oriented relative to the borehole wall 310 of the formation 306 at a non-zero angle (e.g., as shown in FIGS. 3 and 4), a measured wave propagation velocity for the formation 306 associated with ultrasonic acoustic signals emitted by the first transmitter 104 may have an example first error (+$\delta V$), and a measured wave propagation velocity for the formation 306 associated with ultrasonic acoustic signals emitted by the second transmitter 106 may have an example second error (-$\delta V$) that partially and/or completely offsets the first error (+$\delta V$). Averaging the measured wave propagation velocities respectively associated with the first transmitter 104 and the second transmitter 106 compensates the respective errors and provides a robust and reliable measurement for the wave propagation velocity (V) of the formation 306. Averaging the measured wave propagation velocities respectively associated with the first transmitter 104 and the second transmitter 106 may also assist in reducing other random velocity estimation errors.

In some examples, multiple ones (e.g., 2, 3, 4, 8, 16, etc.) of the ultrasonic acoustic sensor 100 of FIGS. 1-4 may be mounted on and/or coupled to a single downhole tool. In some such examples, the transmitters (e.g., the first transmitter 104 and the second transmitter 106) of each of the multiple ultrasonic acoustic sensors 100 may be implemented according to the same preferred and/or critical angle ($\theta$). In other such examples, the transmitters (e.g., the first transmitter 104 and the second transmitter 106) of different ones of the ultrasonic acoustic sensors 100 may be implemented according to different preferred and/or critical angles ($\theta$). For example, the transmitters of a first one of the ultrasonic acoustic sensors 100 of the downhole tool may be implemented according to a first preferred and/or critical angle ($\theta 1$), and the transmitters of a second one of the ultrasonic acoustic sensors 100 of the downhole tool may be implemented according to a second preferred and/or critical angle ($\theta 2$) that differs from the first preferred and/or critical angle ($\theta 1$).

Figure 5:
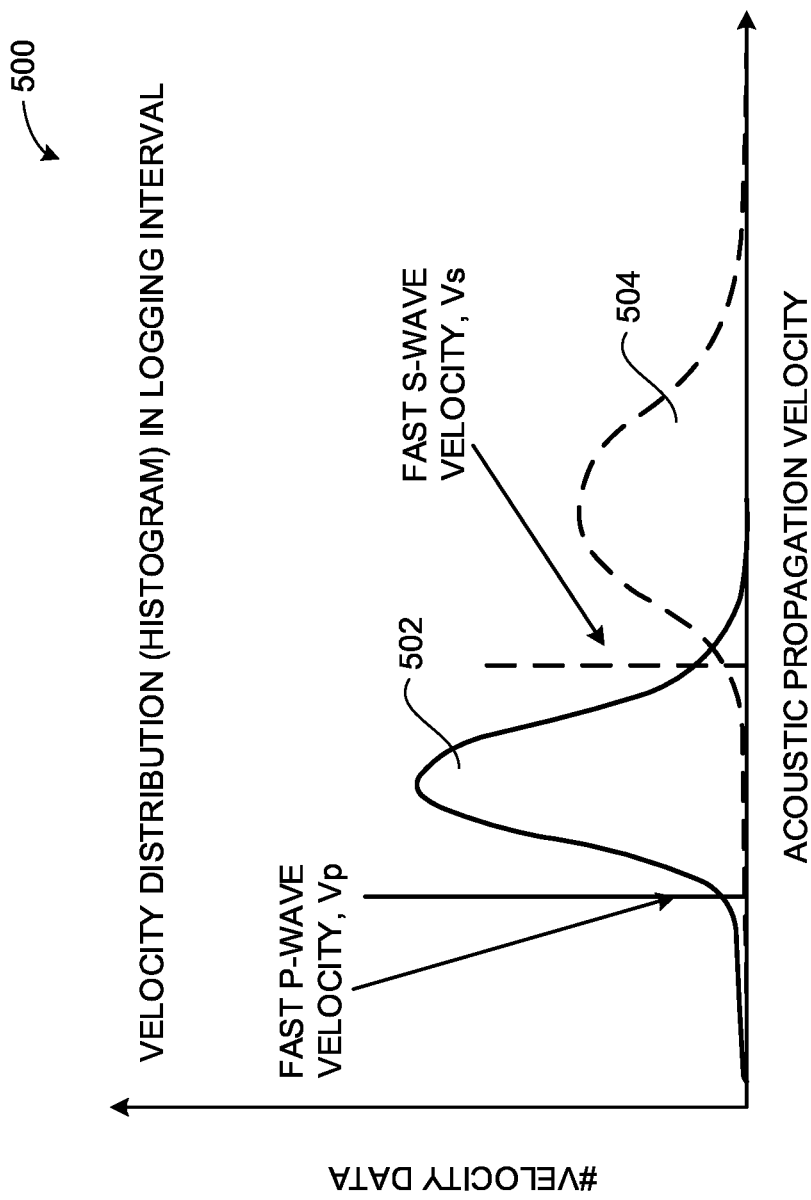
FIG. 5 is an example graph representing an example P-wave velocity distribution and an example S-wave velocity distribution of a target formation.

In some examples, a first preferred and/or critical angle ($\theta 1$) associated with a first one of the ultrasonic acoustic sensors 100 of the downhole tool and a second preferred and/or critical angle ($\theta 2$) associated with a second one of the ultrasonic acoustic sensors 100 of the downhole tool may respectively approximate and/or be close to the critical angles of fast and slow waves (e.g. P & S waves, fast and slow P-waves, fast and slow S-waves) associated with a formation. For example, FIG. 5 is an example graph 500 representing an example P-wave velocity distribution 502 and an example S-wave velocity distribution 504 of a target formation. If the P-wave velocity distribution 502 is centered at $V_p$, the first preferred and/or critical angle (θ1) associated with the first one of the ultrasonic acoustic sensors 100 may be expressed and/or defined as follows:

$$\theta 1 = \sin^{-1}\left(\frac{V_{mud}}{V_p}\right) \quad \text{Equation 3}$$

In Equation 3, $V_p$ is the expected P-wave propagation velocity of a formation, $V_{mud}$ is the expected wave propagation velocity of a well fluid, and θ1 is the first preferred and/or critical angle.

If the S-wave velocity distribution 504 is centered at $V_s$, the second preferred and/or critical angle (θ2) associated with the second one of the ultrasonic acoustic sensors 100 may be expressed and/or defined as follows:

$$\theta 2 = \sin^{-1}\left(\frac{V_{mud}}{V_s}\right) \quad \text{Equation 4}$$

In Equation 4, $V_s$ is the expected S-wave propagation velocity of the formation, $V_{mud}$ is the expected wave propagation velocity of the well fluid, and θ2 is the second preferred and/or critical angle.

A first one of the ultrasonic acoustic sensors 100 of the downhole tool may be implemented according to the first preferred and/or critical angle (θ1), thereby making the first ultrasonic acoustic sensor 100 suitable for P-wave (e.g., fast wave) measurements. A second one of the ultrasonic acoustic sensors 100 of the downhole tool may be implemented according to the second preferred and/or critical angle (θ2), thereby making the second ultrasonic acoustic sensor 100 suitable for S-wave (e.g., slow wave) measurements. Ultrasonic acoustic signals will be excited when the respective tilt angles of the transmitters of the first and second ones of the ultrasonic acoustic sensors 100 are smaller than the respective first and second preferred and/or critical angles associated with the formation. In examples where a fast formation (e.g., carbonate) is targeted, the first preferred and/or critical angle (θ1) and the second preferred and/or critical angle (θ2) can be determined based on the corresponding respective fast ends of compressional and shear wave velocities, 6500 m/s and 3500 m/s. If sandstone, shale, and/or other types of formation is/are targeted, the preferred and/or critical angles can be adjusted based on nominal velocity values.

FIG. 6 is a cross-sectional view of an example first ultrasonic acoustic sensor 600 implemented according to an example first preferred and/or critical angle (θ1) 602. FIG. 7 is a cross-sectional view of an example second ultrasonic acoustic sensor 700 implemented according to an example second preferred and/or critical angle (θ2) 702. Respective ones of the first ultrasonic acoustic sensor 600 and the second ultrasonic acoustic sensor 700 include the housing 102, the first transmitter 104, the second transmitter 106, and the receiver array 108 (e.g., including the receivers 122) of the ultrasonic acoustic sensor 100 of FIGS. 1-4 described above. In the illustrated examples of FIGS. 6 and 7, the second preferred and/or critical angle (θ2) 702 of the transmitters of the second ultrasonic acoustic sensor 700 is greater than the first preferred and/or critical angle (θ1) 602 of the transmitters of the first ultrasonic acoustic sensor 600.

The first ultrasonic acoustic sensor 600 of FIG. 6 is suitable for use in connection with P-wave (e.g., fast wave) formation measurements. The second ultrasonic acoustic sensor 700 of FIG. 7 is suitable for use in connection with S-wave (e.g., slow wave) formation measurements.

FIG. 8 is a schematic of the example first transmitter 104 of the example first ultrasonic acoustic sensor 600 of FIG. 6 exciting an example fast formation wave 802 (e.g., P-wave). FIG. 9 is a schematic of the example first transmitter 104 of the example second ultrasonic acoustic sensor 700 of FIG. 7 exciting an example slow formation wave 902 (e.g., S-wave). In the illustrated example of FIG. 8, the fast formation wave 802 refracts from the formation at an angle that is approximately equal to the first preferred and/or critical angle (θ1) 602 of the first transmitter 104 of the first ultrasonic acoustic sensor 600. In the illustrated example of FIG. 9, the slow formation wave 902 refracts from the formation at an angle that is approximately equal to the second preferred and/or critical angle (θ2) 702 of the first transmitter 104 of the second ultrasonic acoustic sensor 700. As described above, the second preferred and/or critical angle (θ2) 702 is greater than the first preferred and/or critical angle (θ1) 602. The angle at which the slow formation wave 902 refracts from the formation is accordingly greater than the angle at which the fast formation wave 802 refracts from the formation.

Figure 10:
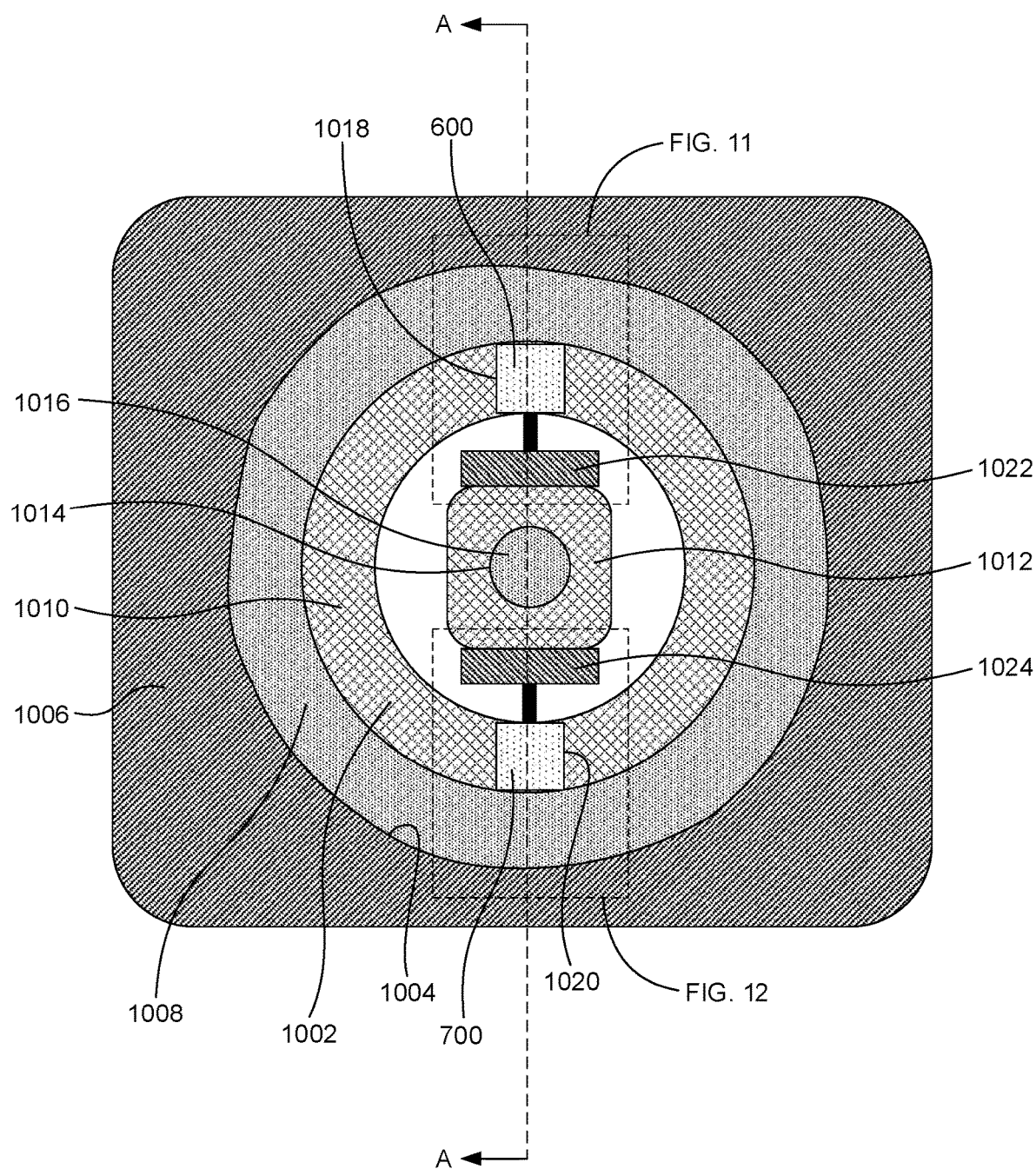
FIG. 10 is a cross-sectional view of a first example downhole tool positioned within an example borehole wall of an example formation in a plane oriented perpendicular to the longitudinal axes of the downhole tool and the borehole.
Figure 11:
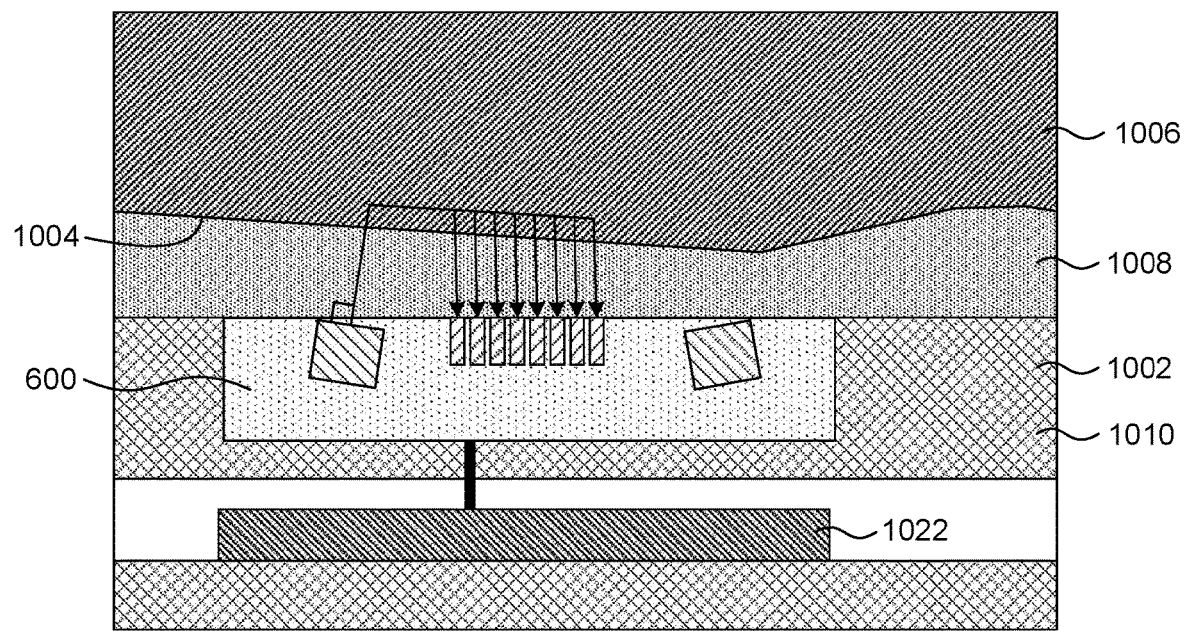
FIG. 11 is a cross-sectional view of a first portion of FIG. 10 in a plane oriented parallel to the longitudinal axes of the downhole tool and the borehole.
Figure 12:
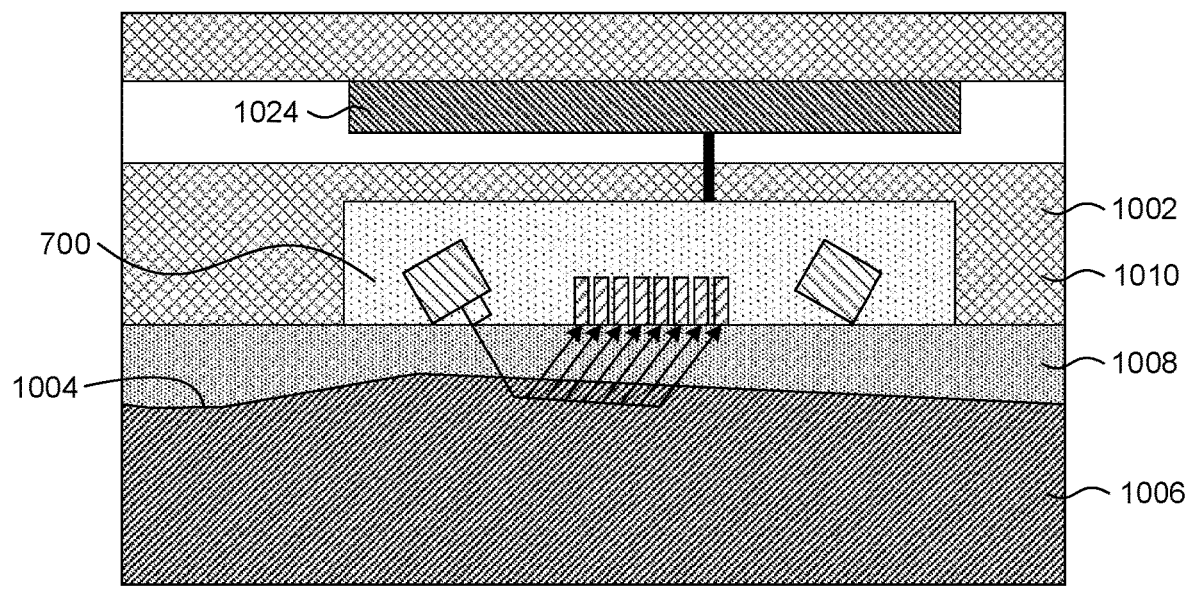
FIG. 12 is a cross-sectional view of a second portion of FIG. 10 in a plane oriented parallel to the longitudinal axes of the downhole tool and the borehole.

FIG. 10 is a cross-sectional view of a first example downhole tool 1002 positioned within an example borehole wall 1004 of an example formation 1006 in a plane oriented perpendicular to the longitudinal axes of the downhole tool 1002 and the borehole. FIG. 11 is a cross-sectional view of a first portion of FIG. 10 (e.g., an upper-half portion of FIG. 10) in a plane oriented parallel to the longitudinal axes of the downhole tool 1002 and the borehole (e.g., a plane oriented along line A-A as shown in FIG. 10). FIG. 12 is a cross-sectional view of a second portion of FIG. 10 (e.g., a lower-half portion of FIG. 10) in a plane oriented parallel to the longitudinal axes of the downhole tool 1002 and the borehole (e.g., a plane oriented along line A-A as shown in FIG. 10).

In the illustrated example of FIGS. 10-12, a spacing and/or void located between the downhole tool 1002 and the borehole wall 1004 of the formation 1006 may be occupied (e.g., partially or substantially filled) by example well fluid 1008 (e.g., drilling mud). The downhole tool 1002 of FIGS. 10-12 includes an example conduit or outer pipe 1010 and an example inner mandrel 1012 that rotate as one tool relative to the borehole wall 1004 of the formation 1006. In some examples, the downhole tool 1002 may be a bottom hole assembly (BHA) used for logging while drilling (LWD), and the outer pipe 1010 may be an outer pipe of the BHA including an example flow tube 1014 that conducts example drilling fluid or mud 1016.

In the illustrated example of FIGS. 10-12, the first ultrasonic acoustic sensor 600 of FIG. 6 is mounted on and/or coupled to the outer pipe 1010 of the downhole tool 1002 at a first azimuthal location 1018, and the second ultrasonic acoustic sensor 700 of FIG. 7 is mounted on and/or coupled to the outer pipe 1010 of the downhole tool 1002 at a second azimuthal location 1020. In some examples, the first ultrasonic acoustic sensor 600 and the second ultrasonic acoustic sensor 700 of FIGS. 10-12 determine acoustic velocity measurements of the formation 1006 at different azimuthal orientations while rotating the downhole tool 1002 while drilling. In the illustrated example of FIGS. 10-12, the first ultrasonic acoustic sensor 600 is operatively coupled to an example first controller 1022 of the downhole tool 1002, and the second ultrasonic acoustic sensor 700 is operatively coupled to an example second controller 1024 of the downhole tool 1002. The first controller 1022 and the second controller 1024 may respectively operate and/or function as described above in connection with the example controller 314 of FIGS. 3 and 4. In some examples, the first controller 1022 and the second controller 1024 are respectively capable of measuring tool orientation referring earth magnetic field (e.g. using a magnetometer) and/or referring gravity (e.g. using an accelerometer), or capable of communicating with other downhole tools that have such functions. In some examples, the first controller 1022 and the second controller 1024 are respectively capable of identifying an azimuthal orientation of the borehole wall 1004 from which acoustic velocities are measured.

In the illustrated example of FIGS. 10-12, the first azimuthal location 1018 of the first ultrasonic acoustic sensor 600 is approximately opposite (e.g., 180° apart from) the second azimuthal location 1020 of the second ultrasonic acoustic sensor 700. In other examples, the second azimuthal location 1020 of the second ultrasonic acoustic sensor 700 may be located at a different position (e.g., 45°, 90°, etc.) relative to the first azimuthal location 1018 of the first ultrasonic acoustic sensor 600. In the illustrated example of FIGS. 10-12, the first ultrasonic acoustic sensor 600 and the second ultrasonic acoustic sensor 700 are approximately co-located along a longitudinal axis of the downhole tool 1002. In other examples, the first ultrasonic acoustic sensor 600 may be spaced apart from the second ultrasonic acoustic sensor 700 along the longitudinal axis of the downhole tool 1002.

As described above in connection with FIGS. 6-9, the first ultrasonic acoustic sensor 600 of the downhole tool 1002 of FIGS. 10-12 is suitable for use in connection with P-wave (e.g., fast wave) formation measurements (e.g., as further shown in FIG. 11), and the second ultrasonic acoustic sensor 700 of the downhole tool 1002 of FIGS. 10-12 is suitable for use in connection with S-wave (e.g., slow wave) formation measurements (e.g., as further shown in FIG. 12). Thus, the downhole tool 1002 of FIGS. 10-12 is capable of measuring formation velocities for P-waves (e.g., fast waves) as well as S-waves (e.g., slow waves). Rotation of the outer pipe 1010 of the downhole tool 1002 enables the first ultrasonic acoustic sensor 600 and the second ultrasonic acoustic sensor 700 of the downhole tool 1002 to respectively measure formation velocities around the entirety of the borehole wall 1004 (e.g., the full wellbore azimuth).

Figure 13:
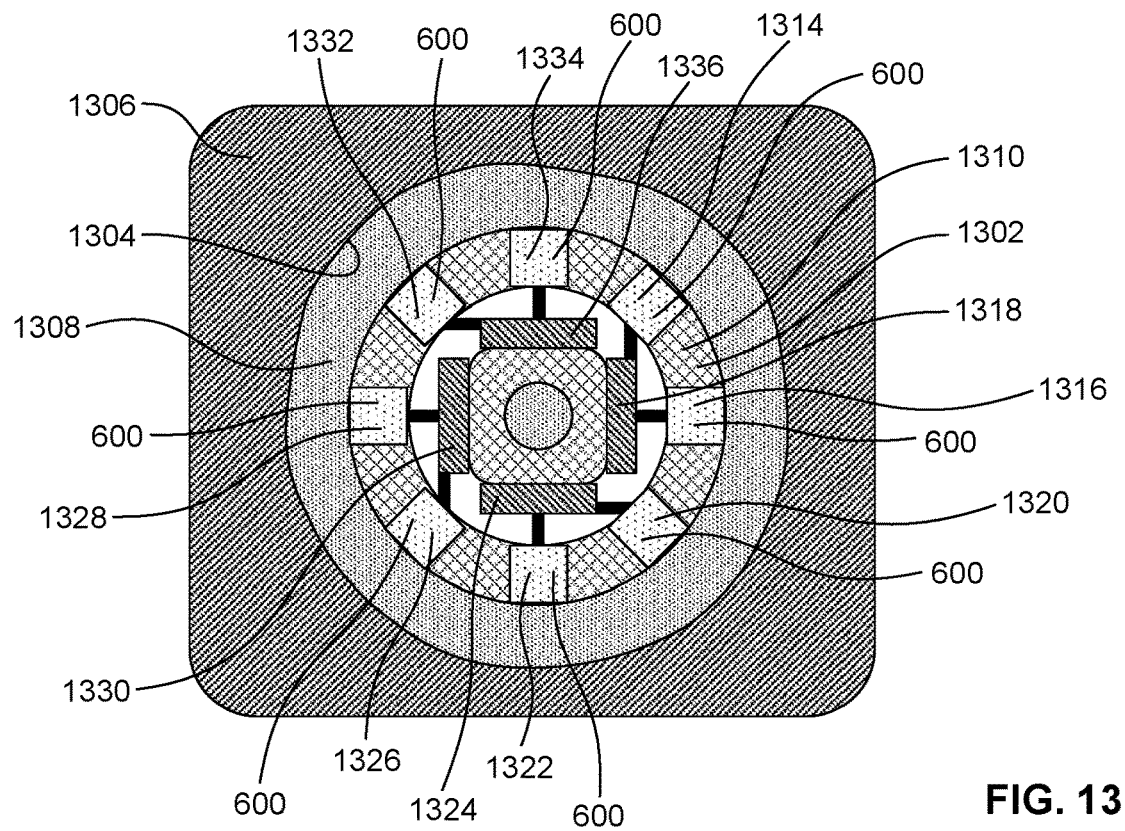
FIG. 13 is a first cross-sectional view of a second example downhole tool positioned within an example borehole wall of an example formation.
Figure 14:
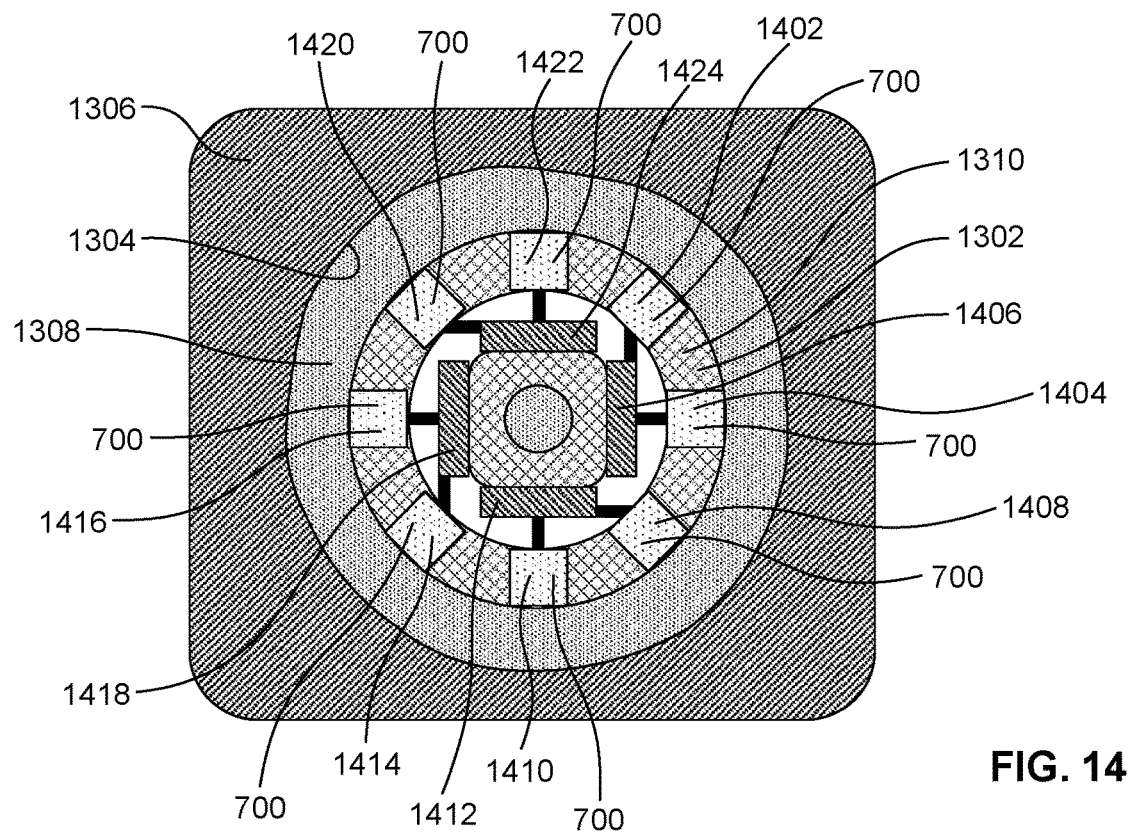
FIG. 14 is a second cross-sectional view of the second example downhole tool of FIG. 13.

FIG. 13 is a first cross-sectional view of a second example downhole tool 1302 positioned within an example borehole wall 1304 of an example formation 1306. FIG. 14 is a second cross-sectional view of the second example downhole tool 1302 of FIG. 13. In the illustrated example of FIGS. 13 and 14, a spacing and/or void located between the downhole tool 1302 and the borehole wall 1304 of the formation 1306 may be occupied (e.g., partially or substantially filled) by example well fluid 1308 (e.g., drilling mud). The downhole tool 1302 of FIGS. 13 and 14 includes an example collar 1310 that does not rotate relative to the borehole wall 1304 of the formation 1306. In some examples, the downhole tool 1302 may be a wireline tool which does not rotate, or a coiled tubing drilling tool which does not rotate quickly enough, to determine full azimuthal (e.g., 360 degree) acoustic velocity measurements of the formation 1306 in the absence of a plurality of azimuthally-distributed first ultrasonic acoustic sensors 600 as shown in FIG. 13, and/or a plurality of azimuthally-distributed second ultrasonic acoustic sensors 700 as shown in FIG. 14.

In the illustrated example of FIGS. 13 and 14, eight of the first ultrasonic acoustic sensors 600 of FIG. 6 are mounted on and/or coupled to the collar 1310 of the downhole tool 1302 at equally-spaced azimuthal intervals (e.g. 45° apart from one another) at a first axial location along a longitudinal axis of the downhole tool 1302 (e.g., as shown in the first cross-sectional view of FIG. 13). Eight of the second ultrasonic acoustic sensors 700 of FIG. 7 is mounted on and/or coupled to the collar 1310 of the downhole tool 1302 at equally-spaced azimuthal intervals (e.g. 45° apart from one another) at a second axial location along the longitudinal axis of the downhole tool 1302 different from the first location (e.g., as shown in the second cross-sectional view of FIG. 14). Thus, the first ultrasonic acoustic sensors 600 of the downhole tool 1302 are spaced apart from the second ultrasonic acoustic sensors 700 of the downhole tool 1302 along the longitudinal axis of the downhole tool 1302.

In the illustrated example of FIG. 13, example first and second ones 1314, 1316 of the first ultrasonic acoustic sensors 600 are operatively coupled to an example first controller 1318 of the downhole tool 1302. Example third and fourth ones 1320, 1322 of the first ultrasonic acoustic sensors 600 are operatively coupled to an example second controller 1324 of the downhole tool 1302. Example fifth and sixth ones 1326, 1328 of the first ultrasonic acoustic sensors 600 are operatively coupled to an example third controller 1330 of the downhole tool 1302. Example seventh and eighth ones 1332, 1334 of the first ultrasonic acoustic sensors 600 are operatively coupled to an example fourth controller 1336 of the downhole tool 1302. The first controller 1318, second controller 1324, third controller 1330, and fourth controller 1336 of FIG. 13 may respectively operate and/or function as described above in connection with the example controller 314 of FIGS. 3 and 4. In other examples, the downhole tool 1302 may include a different number of first ultrasonic acoustic sensors 600 and/or a different number of controllers relative to the number of first ultrasonic acoustic sensors 600 and/or controllers shown in FIG. 13. In some examples, one or more of the first, second, third and/or fourth controllers 1318, 1324, 1330, 1336 of FIG. 13 is/are capable of measuring azimuthal orientations of the first ultrasonic acoustic sensors 600 of FIG. 13 when ultrasonic acoustic velocities are measured (e.g., using a magnetometer and/or an accelerometer).

In the illustrated example of FIG. 14, example first and second ones 1402, 1404 of the second ultrasonic acoustic sensors 700 are operatively coupled to an example fifth controller 1406 of the downhole tool 1302. Example third and fourth ones 1408, 1410 of the second ultrasonic acoustic sensors 700 are operatively coupled to an example sixth controller 1412 of the downhole tool 1302. Example fifth and sixth ones 1414, 1416 of the second ultrasonic acoustic sensors 700 are operatively coupled to an example seventh controller 1418 of the downhole tool 1302. Example seventh and eighth ones 1420, 1422 of the second ultrasonic acoustic sensors 700 are operatively coupled to an example eighth controller 1424 of the downhole tool 1302. The fifth controller 1406, sixth controller 1412, seventh controller 1418, and eighth controller 1424 of FIG. 14 may respectively operate and/or function as described above in connection with the example controller 314 of FIGS. 3 and 4. In other examples, the downhole tool 1302 may include a different number of second ultrasonic acoustic sensors 700 and/or a different number of controllers relative to the number of second ultrasonic acoustic sensors 700 and/or controllers shown in FIG. 14. In some examples, one or more of the fifth, sixth, seventh and/or eighth controllers 1406, 1412, 1418, 1424 of FIG. 14 is/are capable of measuring azimuthal orientations of the second ultrasonic acoustic sensors 700 of FIG. 14 when ultrasonic acoustic velocities are measured (e.g., using a magnetometer and/or an accelerometer).

As described above in connection with FIGS. 6-9, the first ultrasonic acoustic sensors 600 of the downhole tool 1302 of FIGS. 13 and 14 are suitable for use in connection with P-wave (e.g., fast wave) formation measurements, and the second ultrasonic acoustic sensors 700 of the downhole tool 1302 of FIGS. 13 and 14 are suitable for use in connection with S-wave (e.g., slow wave) formation measurements. Thus, the downhole tool 1302 of FIGS. 13 and 14 is capable of measuring formation velocities for P-waves (e.g., fast waves) as well as S-waves (e.g., slow waves). In the illustrated example of FIGS. 13 and 14, the number and spatial arrangement of the first ultrasonic acoustic sensors 600 and the second ultrasonic acoustic sensors 700 is suitable to enable the first ultrasonic acoustic sensors 600 and the second ultrasonic acoustic sensors 700 of the downhole tool 1302 to measure formation velocities around the entirety of the borehole wall 1004 (e.g., the full wellbore azimuth).

The example ultrasonic acoustic sensors described above may be mounted on drilling tools. For example, any of the above-described ultrasonic acoustic sensors may be mounted on drilling tools as described and illustrated in connection with FIGS. 9, 14 and 15 of U.S. Patent Application Publication No. 2017/0314385 A1, published on Nov. 2, 2017, the entirety of which is incorporated by reference herein.

The example controllers 314, 1022, 1024, 1318, 1324, 1330, 1336, 1406, 1412, 1418, 1424 of the examples of FIGS. 3, 4, and 10-14 may be implemented by hardware, software, firmware and/or any combination of hardware, software and/or firmware. Thus, for example, any of the example controllers 314, 1022, 1024, 1318, 1324, 1330, 1336, 1406, 1412, 1418, 1424 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example controllers 314, 1022, 1024, 1318, 1324, 1330, 1336, 1406, 1412, 1418, 1424 is/are hereby expressly defined to include a non-transitory computer readable storage device or storage disk such as a memory, a digital versatile disk (DVD), a compact disk (CD), a Blu-ray disk, etc. including the software and/or firmware. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 15:
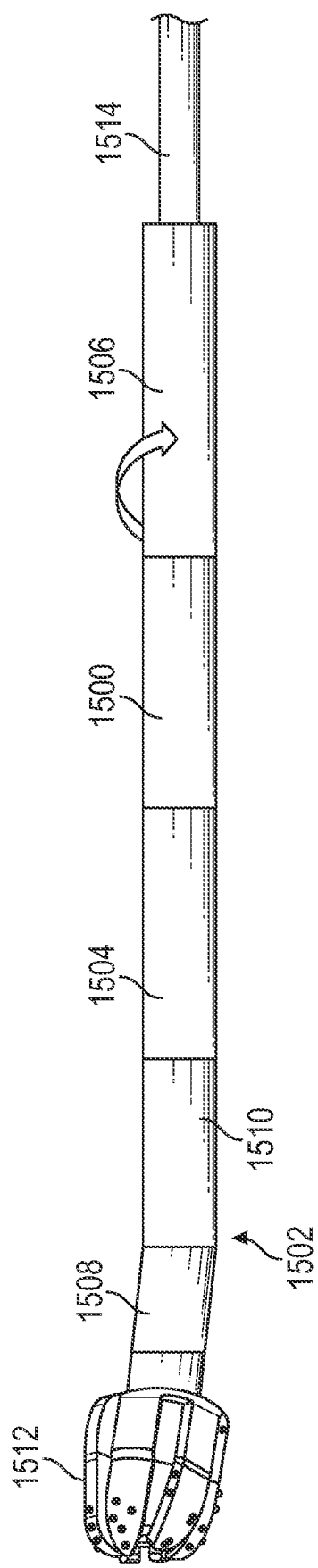
FIG. 15 is a side view of an example bottom hole assembly that may be implemented in accordance with the teachings of this disclosure.

FIG. 15 is a side view of an example bottom hole assembly (BHA) 1500 that may be implemented in accordance with the teachings of this disclosure. The BHA 1500 of FIG. 15 may be used for geo-steering coiled tubing drilling (CTD). In the illustrated example of FIG. 15, the BHA 1500 is implemented in the form of a logging while drilling (LWD) acoustic/ultrasonic BHA that enables geo-steering of a coiled tubing drilling (CTD) tool 1502. In this example, the BHA 1500 of the CTD tool 1502 is illustrated between a float sub, which may contain an example gravity and magnetic tool face measurement (MWD) system 1504, and an example orienter 1506. The orienter 1506 and the MWD system 1504 may be used in cooperation to provide steering data from an orientation survey provided by the MWD system 1504. The CTD tool 1502 may also include an example mud motor 1508 coupled between an example bent sub 1510 and an example drill bit 1512. Example coiled tubing 1514 may be used to deploy the CTD tool 1502 downhole into the borehole. In some examples, the BHA 1500 of FIG. 15 includes one or more of the example ultrasonic acoustic sensors of FIGS. 1-14 described above.

Figure 16:
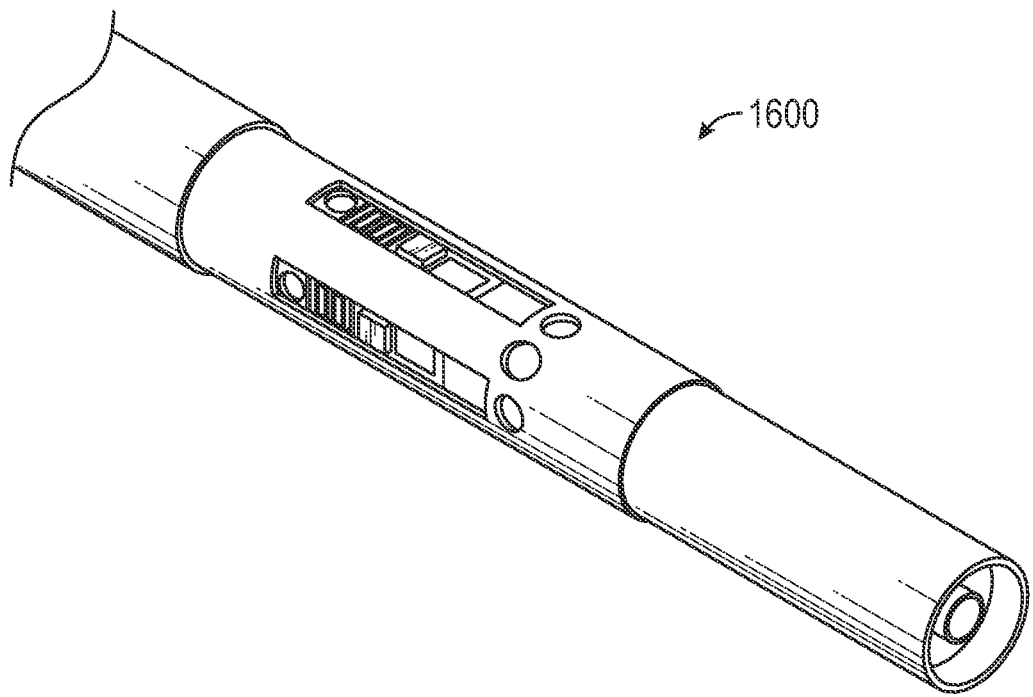
FIG. 16 is a perspective view of an example coiled tubing drilling apparatus that may be implemented in accordance with the teachings of this disclosure.

FIG. 16 is a perspective view of an example coiled tubing drilling (CTD) apparatus 1600 that may be implemented in accordance with the teachings of this disclosure. In the illustrated example of FIG. 16, the CTD apparatus 1600 is a non-rotating CTD tool. In some examples, the CTD apparatus 1600 of FIG. 16 includes one or more of the example ultrasonic acoustic sensors of FIGS. 1-14 described above.

Figure 17:
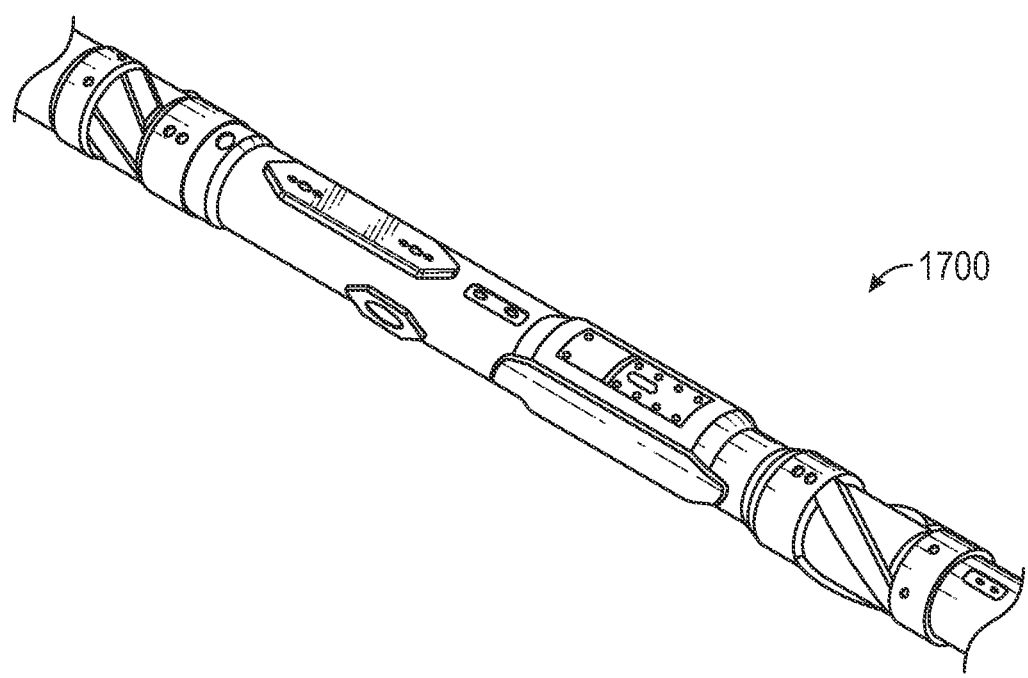
FIG. 17 is a perspective view of an example logging while drilling apparatus that may be implemented in accordance with the teachings of this disclosure.

FIG. 17 is a perspective view of an example logging while drilling (LWD) apparatus 1700 that may be implemented in accordance with the teachings of this disclosure. In the illustrated example of FIG. 17, the LWD apparatus 1700 is a rotating LWD tool. In some examples, the LWD apparatus 1700 of FIG. 17 includes one or more of the example ultrasonic acoustic sensors of FIGS. 1-14 described above.

The ultrasonic acoustic sensors, assemblies and/or devices described above may be used to enable automated and/or interactive steering inputs for steering a variety of well strings such as a well string having the example CTD tool 1502 of FIG. 15, the example CTD tool 1600 of FIG. 16, or the example LWD tool 1700 of FIG. 17. The disclosed ultrasonic acoustic sensors may be arranged in various configurations with differing numbers of ultrasonic acoustic sensors depending on the parameters of a given application. Additionally, the disclosed ultrasonic acoustic sensors may include various arrangements of transmitters and/or receivers. Data processing may be conducted downhole and/or at the surface to provide geo-steering inputs for steering of the well string according to knowledge gained regarding formation and/or drilling characteristics. The steering inputs may be used to control an orienter (e.g., the orienter 1506 of FIG. 15) or other type of tool steering assembly.

Figure 18:
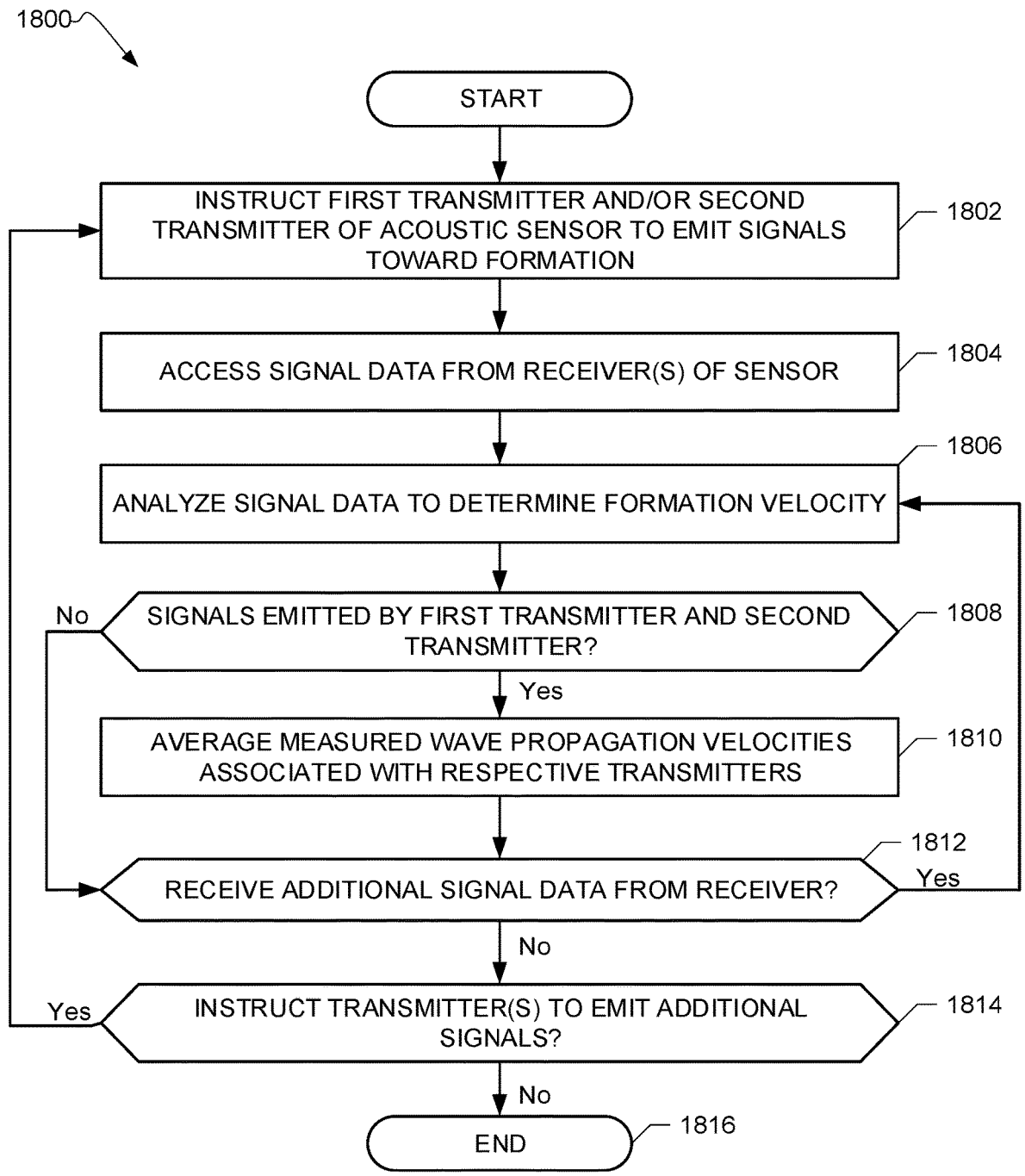
FIG. 18 is a flowchart of an example method that may be executed by a processor to analyze data generated by any of the example sensors of FIGS. 1, 6, and/or 7.

FIG. 18 is a flowchart of an example method 1800 for providing for velocity error compensation when measuring formation velocities based on signal data generated by the example acoustic sensors 100, 600, 700 disclosed herein. The example method 1800 of FIG. 18 may be implemented by a processor, such as any of the example controllers 314, 1022, 1024, 1318, 1324, 1330, 1336, 1406, 1412, 1418, 1424 of the examples of FIGS. 3, 4, and 10-14. For illustrative purposes, the example method 1800 will be discussed below in connection with the example controller 314 of FIG. 3.

The example method 1800 of FIG. 18 includes instructing a first transmitter and/or a second transmitter of an acoustic sensor to emit ultrasonic acoustic signals toward a formation (block 1802). For example, the controller 314 instructs the first transmitter 104 and/or the second transmitter 106 of the example sensor(s) 100, 600, 700 to emit signals 302, 402 toward the formation 306 to excite formation waves. In examples in which the controller 314 instructs the first transmitter 104 and the second transmitter 106 to emit signals, the signals emitted by each of the transmitters 104, 106 are emitted in different directions based on the orientations of the transmitters 104, 106 relative to the receiver array 108 (e.g., the respective angles θ of FIGS. 2, 6, 7). In some examples, the controller 314 selectively instructs the first transmitter 104 and/or the second transmitter 106 to emit signals to excite fast formation waves or slow formation waves based on the orientations of the transmitters.

The example method 1800 of FIG. 18 includes accessing signal data from one or more receivers of the sensor (block 1804). For example, the controller 314 may access signal data from the receiver(s) 122 of the receiver array 108 of the example sensor(s) 100, 600, 700. The signal data received from the receiver(s) 122 corresponds to formation waves collected by the receiver(s) 122 in response to the signals emitted by the first transmitter 104 and/or the second transmitter 106.

The example method 1800 of FIG. 18 includes analyzing the signal data to determine formation velocity, or a wave propagation velocity for the formation (block 1806). For example, the controller 314 may execute one or more waveform processing algorithms to determine the formation velocity.

The example method 1800 of FIG. 18 provides for velocity error compensation in determining the formation velocity when, for instance, the receiver(s) of the sensor are orientated at an angle relative to, for instance, a borehole in the formation. As mentioned above, in some examples, signals are emitted by the first and second transmitters (e.g., based on instructions received by the transmitters at block 1802) (block 1808). In such examples, the example method 1800 of FIG. 18 includes averaging the wave propagation velocities respectively associated with the first transmitter and the second transmitter and detected by the receiver(s) of the acoustic sensor(s) (block 1810). For instance, a wave propagation velocity for the formation 306 associated with ultrasonic acoustic signals emitted by the first transmitter 104 and determined based on the signal data received from receiver(s) 122 may have an example first error value (+δV). A wave propagation velocity for the formation 306 associated with ultrasonic acoustic signals emitted by the second transmitter 106 and determined based on the signal data received from receiver(s) 122 may have an example second error value (−δV). The controller 314 averages the wave propagation values to partially offset or substantially completely offset the first error value (+δV) with the second error value (−δV). Thus, the example method 1800 provides for velocity error compensation when measuring formation velocities.

The example method 1800 continues with analyzing signal data collected by the receiver(s) until there is no further data to be accessed (block 1812). The example method 1800 when no further instructions are to be transmitted to the transmitters with respect to emitting signals (blocks 1814, 1816).

The flowchart of FIG. 18 is representative of example hardware logic, machine readable instructions, hardware implemented state machines, and/or any combination thereof. The machine readable instructions may be one or more executable programs or portion(s) of an executable program for execution by a computer processor such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowchart illustrated in FIG. 18, many other methods may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIG. 18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 19:
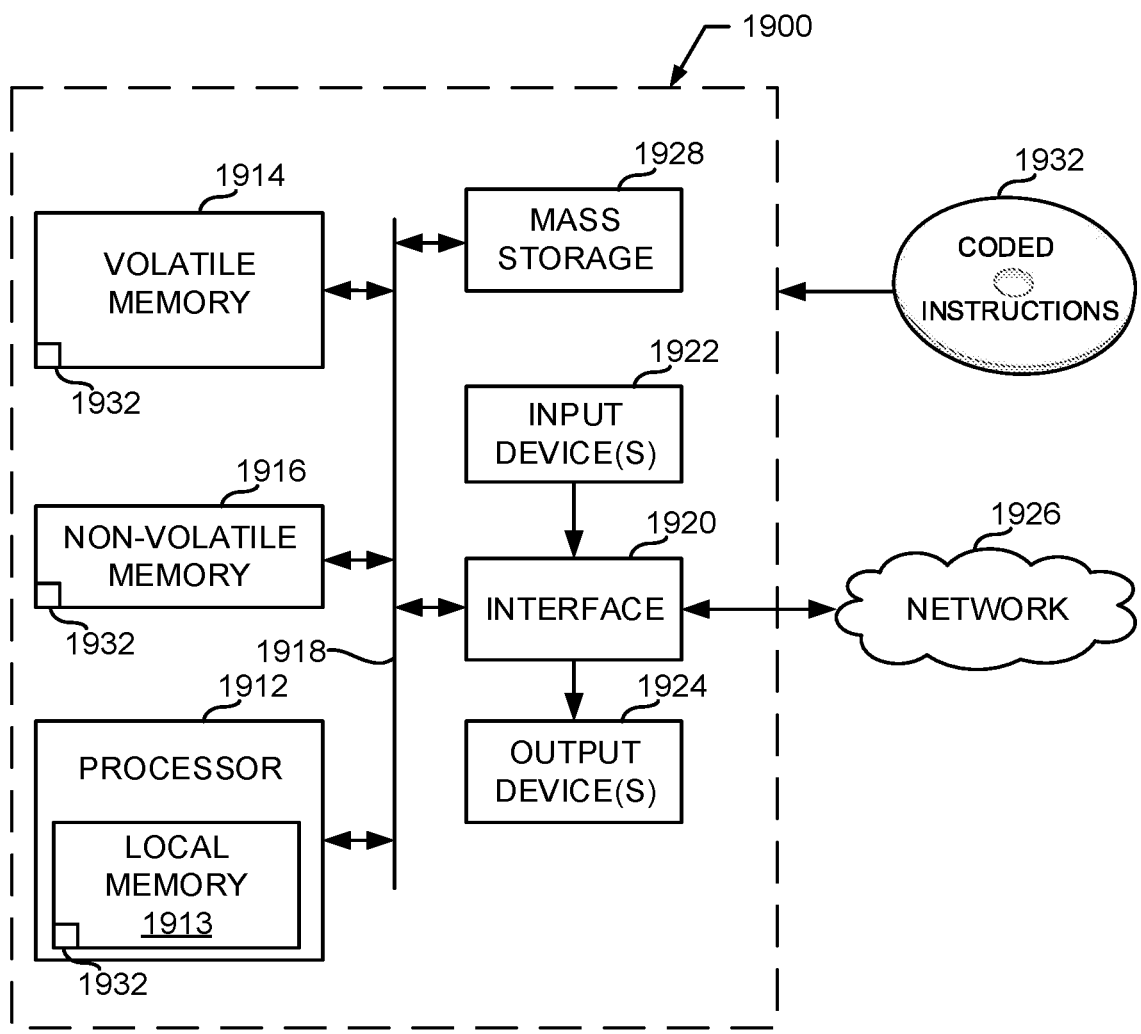
FIG. 19 is a processor platform to execute instructions to implement the method of FIG. 18.

FIG. 19 is a block diagram of an example processor platform 1900 structured to execute the instructions of FIG.

18. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIG. 19 may be stored in the mass storage device 1928, in the volatile memory 1914, in the non-volatile memory 1916, and/or on a removable non-transitory computer readable storage medium such as a CD or DVD.

From the foregoing, it will be appreciated that example apparatus, articles of manufacture, and methods have been disclosed herein for measuring formation velocities. Example sensors disclosed herein include transmitters titled or otherwise disposed at an angle relative to a receiver of the sensor. Example sensors disclosed herein can be used to excite fast formation waves or slow formation waves toward the receiver based on the angle(s) of the transmitter(s). Some examples disclosed herein include two transmitters disposed at opposite but equal magnitude angles. In some such examples, errors in velocity measurements determined from signal data associated with the respective transmitters can be offset by averaging the wave propagation velocities respectively associated with the transmitters. As a result, examples disclosed herein provide for velocity error compensation when measuring formation velocities.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example sensor includes a housing, a first transmitter carried by the housing, a second transmitter carried by the housing, and a receiver array carried by the housing and disposed between the first transmitter and the second transmitter. The first transmitter is disposed at a first angle relative to a surface the housing and the second transmitter is disposed at second angle relative to the surface the housing In some examples, the first angle and the second angle are equal in magnitude and a direction of the first angle relative to the housing is opposite a direction of the second angle In some examples, the first transmitter is to excite one of a fast formation wave or a slow formation wave based on the first angle of the first transmitter.

In some examples, the first angle is based on wave propagation velocity of a fluid of a well in which the sensor is to be located.

In some examples, the receiver array is aligned with the surface of the housing.

In some examples, the first transmitter is to emit a first signal to excite a first formation wave in a first direction and the second transmitter is to emit a second signal to excite a second formation wave in a second direction opposite the first direction.

In some such examples, the first direction is oriented toward the receiver array and the second direction is oriented toward the receiver array.

In some examples, the receiver array includes a plurality of receivers. In such examples, the receiver array extends between the first transmitter and the second transmitter. A first one of the receivers and a second one of the receivers is spaced apart by a first distance and a third one of the receivers and a fourth one of the receivers is spaced apart by the first distance.

In some such examples, a first one of the receivers is oriented to have a substantially similar sensitivity to signals associated with the first transmitter and signals associated with the second transmitter.

An example tool for measuring a formation velocity of a formation includes a sensor to be disposed in the formation. The sensor includes a first transmitter, a second transmitter, and a first receiver array. The first transmitter is disposed at a first angle relative to the first receiver array and the second transmitter disposed at a second angle relative to the first receiver array. The tool includes a processor to receive signal data from the sensor and determine the formation velocity based on the signal data.

In some examples, the processor is to determine a first wave propagation velocity based on signal data associated with the first transmitter and a second wave propagation velocity based on signal data associated with the second transmitter.

In some examples, the processor is to calculate an average of the first wave propagation velocity and the second wave propagation velocity.

In some such examples, the sensor is to be disposed at an angle relative to a borehole wall of the formation.

In some examples, the sensor is a first sensor and the tool further includes a second sensor disposed in the formation. The second sensor includes a third transmitter and a fourth transmitter, and a second receiver array. The third transmitter is disposed at a third angle relative to the second receiver array and the second transmitter disposed at a fourth angle relative to the second receiver array. The second angle is greater than the first angle of the first transmitter of the first sensor.

In some such examples, the first transmitter is to emit a first signal to excite a fast formation wave and wherein the third transmitter is to emit a second signal to excite a slow formation wave.

In some such examples, the tool further includes a conduit. In such examples, the first sensor is coupled to the conduit at a first position and the second sensor is coupled to the conduit at a second position, the second position one of azimuthally spaced apart from the first position or axially spaced apart from the first position.

An example apparatus includes first means for emitting ultrasonic acoustic signals in a formation, second means for emitting ultrasonic acoustic signals in a formation, and means for detecting ultrasonic acoustic waves generated in response to one or more of (a) the ultrasonic acoustic signals emitted by the first means for emitting and (b) the ultrasonic acoustic signals emitted by the second means for emitting. The means for detecting is to generate signal data based on the ultrasonic acoustic waves. The first means for emitting is disposed at a first angle relative to the means for detecting and the second means is disposed at a second angle relative to the means for detecting. The example apparatus includes means for determining a formation velocity based on the signal data.

In some examples, the first means for emitting, the second means for emitting, and the means for detecting are disposed in a housing.

In some examples, the means for detecting is disposed between the first means for emitting and the second means for emitting.

In some examples, a direction of the first angle relative to the means for detecting is opposite a direction of the second angle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A tool for measuring a formation velocity of a formation, the tool comprising:
 a sensor to be disposed in the formation, the sensor including a first transmitter, a second transmitter, and a first receiver array carried by a housing, the first transmitter disposed at a first angle relative to the first receiver array and the second transmitter disposed at a second angle relative to the first receiver array; and
 a processor to receive signal data from the sensor and determine a first wave propagation velocity of the formation based on signal data associated with the first transmitter and a second wave propagation velocity of the formation based on signal data associated with the second transmitter; and
 wherein the processor is further configured to calculate an average velocity of the formation, the average velocity of the formation being an average of the first wave propagation velocity of the formation and the second wave propagation velocity of the formation.

2. The tool of claim 1, wherein the sensor is to be disposed at an angle relative to a borehole wall of the formation.

3. The tool of claim 1, wherein the sensor is a first sensor and further including a second sensor disposed in the formation, the second sensor including:
 a third transmitter and a fourth transmitter, and a second receiver array, the third transmitter disposed at a third angle relative to the second receiver array and the second transmitter disposed at a fourth angle relative to the second receiver array, the second angle greater than the first angle of the first transmitter of the first sensor.

4. The tool of claim 3, wherein the first transmitter is to emit a first signal to excite a fast formation wave and wherein the third transmitter is to emit a second signal to excite a slow formation wave.

5. The tool of claim 3, further including a conduit, the first sensor coupled to the conduit at a first position and the second sensor coupled to the conduit at a second position, the second position one of azimuthally spaced apart from the first position or axially spaced apart from the first position.

6. The tool of claim 1, wherein the first angle and the second angle are equal in magnitude and wherein a direction of the first angle relative to the housing is opposite a direction of the second angle.

7. The tool of claim 1, wherein the first transmitter is to excite one of a fast formation wave or a slow formation wave based on the first angle of the first transmitter.

8. The tool of claim 1, wherein the first angle is based on wave propagation velocity of a fluid of a well in which the sensor is to be located.

9. The tool of claim 1, wherein the receiver array is aligned with the surface of the housing.

10. The tool of claim 1, wherein the first transmitter is to emit a first signal to excite a first formation wave in a first direction and the second transmitter is to emit a second signal to excite a second formation wave in a second direction opposite the first direction.

11. The tool of claim 10, wherein the first direction is oriented toward the receiver array and the second direction is oriented toward the receiver array.

12. The tool of claim 1, wherein the receiver array includes a plurality of receivers, the receiver array extending between the first transmitter and the second transmitter, a first one of the receivers and a second one of the receivers spaced apart by a first distance and a third one of the receivers and a fourth one of the receivers spaced apart by the first distance.

13. The tool of claim 1, wherein a first one of the receivers is oriented to have substantially similar sensitivity to signals associated with the first transmitter and signals associated with the second transmitter.

* * * * *